United States Patent
Agrawal et al.

(10) Patent No.: US 12,332,866 B1
(45) Date of Patent: Jun. 17, 2025

(54) METADATA SEARCH, FILTERING, AND AGGREGATION USING INDEXES

(71) Applicant: Rubrik, Inc., Palo Alto, CA (US)

(72) Inventors: Shivanshu Agrawal, Sunnyvale, CA (US); Daniel Hefenbrock, Seattle, WA (US); Muraliraja Muniraju, Fremont, CA (US); Anshul M. Gupta, San Jose, CA (US); Takeshi Suzuki, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 18/600,483

(22) Filed: Mar. 8, 2024

(51) Int. Cl.
| | | |
|---|---|---|
| G06F 16/22 | (2019.01) | |
| G06F 16/25 | (2019.01) | |
| G06F 16/28 | (2019.01) | |

(52) U.S. Cl.
CPC ........ G06F 16/2246 (2019.01); G06F 16/258 (2019.01); G06F 16/285 (2019.01)

(58) Field of Classification Search
CPC ... G06F 16/2246; G06F 16/258; G06F 16/285
See application file for complete search history.

(56) References Cited

U.S. PATENT DOCUMENTS

| | | | | |
|---|---|---|---|---|
| 7,689,602 B1* | 3/2010 | Sim-Tang | ........... | G06F 11/1448 707/673 |
| 8,595,237 B1* | 11/2013 | Chaudhary | ............. | G06F 16/14 707/741 |
| 2012/0011127 A1* | 1/2012 | Kim | .................... | G06F 16/2282 707/743 |
| 2014/0032566 A1* | 1/2014 | Agarwal | ............... | G06F 16/319 707/741 |
| 2014/0188840 A1* | 7/2014 | Agarwal | ............. | G06F 16/2228 707/711 |
| 2019/0188289 A1* | 6/2019 | Suzuki | .................. | G06F 16/221 |
| 2020/0301899 A1* | 9/2020 | Tu | ........................ | G06F 16/2453 |
| 2022/0164345 A1* | 5/2022 | Ben Moshe | ........ | G06F 13/4027 |

\* cited by examiner

*Primary Examiner* — Huawen A Peng
(74) *Attorney, Agent, or Firm* — Holland & Hart LLP

(57) ABSTRACT

Methods, systems, and devices for data management are described. A data management system (DMS) may obtain metadata associated with a snapshot stored by the DMS and including information associated with data paths in the snapshot. The DMS may scan an index registry for identifiers of the data paths to determine whether the index registry includes namespace and hierarchical index information that map the data paths to path identifiers and to descendent data paths within the snapshot, respectively. The DMS may generate term and count index information based on the metadata. The term and count index information may map terms to data paths that include the terms and numerical values associated with the terms, respectively. The DMS may store, in the index registry, the term and count index information with an identifier of a corresponding index group. The namespace and hierarchical index information may be common to multiple index groups.

20 Claims, 13 Drawing Sheets

Namespace Index Information

| ID | Path | Time | Size |
|---|---|---|---|
| 0 | /dir/file1 | Jan 09 | 434 |
| 1 | /dir/file2 | Jan 09 | 323 |
| 2 | /file3 | Jan 09 | 58786 |

FIG. 4A

Hierarchical Index Information

| Depth | Path | Child IDs |
|---|---|---|
| 0 | / | 0-2 |
| 1 | /dir/ | 0-1 |
| 1 | /file3 | 2 |
| 2 | /dir/file1 | 0 |
| 2 | /dir/file3 | 1 |

FIG. 4B

| Term Index Information | | |
|---|---|---|
| Field | Term | Bitmap |
| Path | dir | {0, 1} |
| Path | file1 | {0} |
| Path | file2 | {1} |
| Suspicious | | {2} |

| Count Index Information | | |
|---|---|---|
| Field | Term | Bitmaps |
| Size | | [64]Bitmaps |
| AnalyzerHits | Analyzer1 | [64]Bitmaps |
| AnalyzerHits | Analyzer2 | [64]Bitmaps |

METADATA SEARCH, FILTERING, AND AGGREGATION USING INDEXES

FIELD OF TECHNOLOGY

The present disclosure relates generally to data management, including techniques for metadata search, filtering, and aggregation using indexes.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 4A and 4B show examples of index formats that support metadata search, filtering, and aggregation using indexes in accordance with aspects of the present disclosure.

FIGS. 5A and 5B show examples of index formats that support metadata search, filtering, and aggregation using indexes in accordance with aspects of the present disclosure.

DETAILED DESCRIPTION

Figure 1:
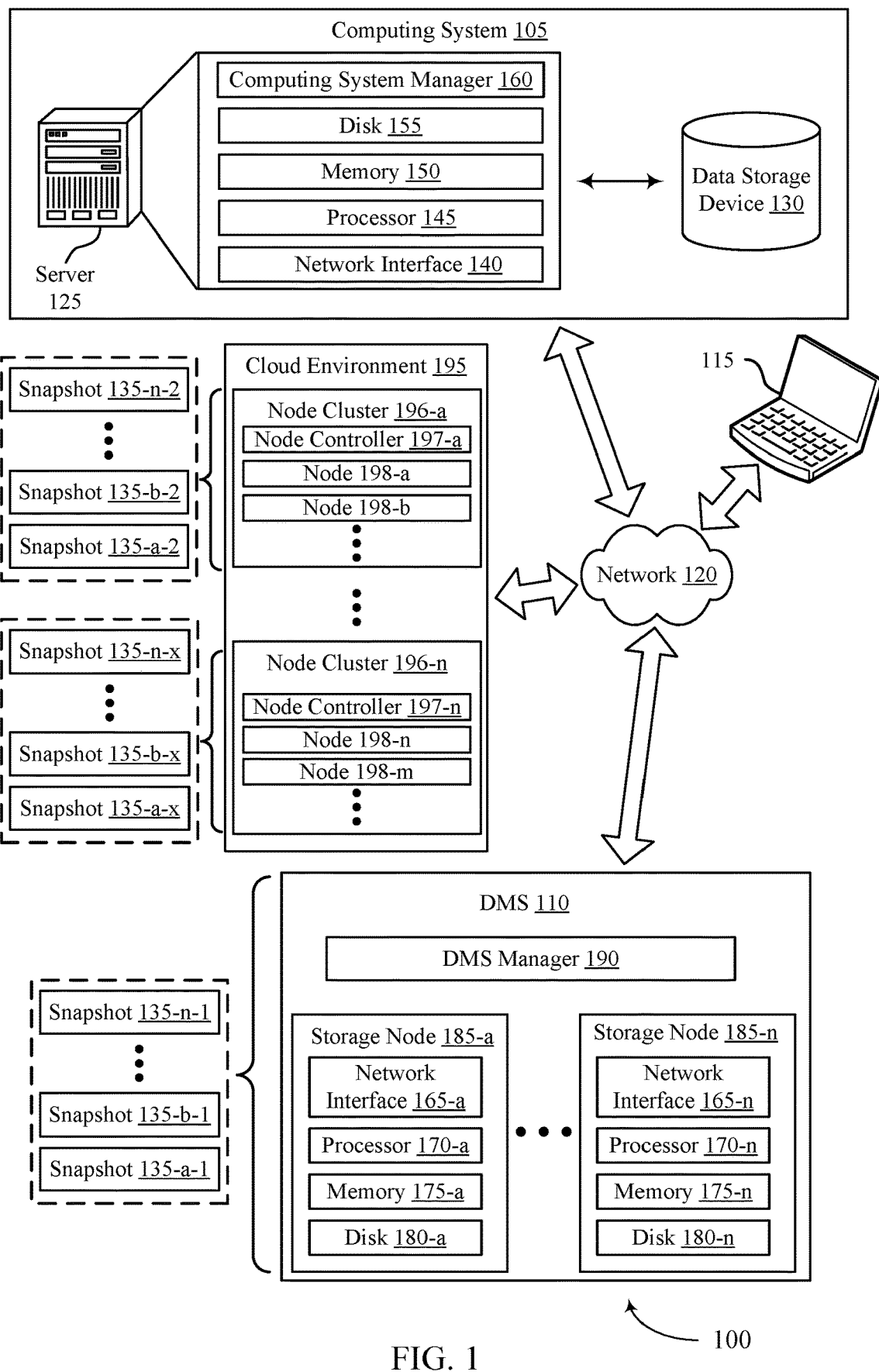
FIG. 1 illustrates an example of a computing environment that supports metadata search, filtering, and aggregation using indexes in accordance with aspects of the present disclosure.

A data management system (DMS) may backup customer data and may store the corresponding backup data. The DMS may support one or more applications, which may analyze backup data stored by the DMS and may generate metadata based on such analysis. Metadata generated by such applications may indicate, for example, sensitive data types, an indication of suspicious data, other types of metadata, or any combination thereof. The metadata may be hierarchical in nature (e.g., may relate to various files and directories that may depend from one another in a hierarchical fashion). The metadata may be associated with snapshots obtained by the DMS, such that the metadata may be immutable and may not change over time, and thus some indexing techniques (e.g., techniques designed to support indexing of dynamically changing information) may involve unnecessary and undesirable complexities. Additionally, some current systems may not support aggregation and filtering of hierarchical metadata across various parameters.

Techniques described herein provide for a DMS to efficiently index the metadata generated by various applications on a per-snapshot basis using bitmap and bit slice indexing techniques. The bitmap and bit slice techniques may be compatible with the immutable snapshot metadata, and may support aggregation and filtering of hierarchical data across various parameters. Thus, a user may request to view certain types and portions of the metadata by filtering the metadata over various parameters.

The DMS may obtain a snapshot of a filesystem and may provide the snapshot to one or more applications (e.g., malware scanning applications, data classification applications). The applications may generate metadata associated with the snapshot. The DMS may generate some common index information that indexes all metadata associated with the snapshot and some per-application index information that indexes application-specific metadata. The common index information may include information that indexes the metadata over a namespace of the filesystem and indexes the metadata over a hierarchy associated with the filesystem. The DMS may store the generated index information in an index registry. When the DMS receives metadata from an application, the DMS may first scan the index registry to determine whether common index information is already present for the metadata. If not, the DMS may generate and store the common index information. The DMS may subsequently generate and store the per-application index information in the index registry. The per-application index information may include information that indexes the metadata across one or more terms (e.g., a sensitive data term or other term) and one or more numerical values (e.g., a count index).

A client of the DMS may transmit, via a user interface, a request to view certain data associated with their filesystem. For example, the client may request to view sensitive data stored within any folders under a first file path in the file system. The DMS may utilize the index information stored in the index registry to identify and retrieve the requested data. For example, the DMS may scan the index registry for the requested file path and may filter by the requested term (e.g., sensitive data) and the hierarchical indexes associated with the requested file path. The index information may be stored in the form of bitmaps and bit slices, such that the DMS may efficiently compare and process the index information to identify the correct data. The DMS may output the requested data to the client.

FIG. 1 illustrates an example of a computing environment 100 that supports metadata search, filtering, and aggregation using indexes in accordance with aspects of the present disclosure. The computing environment 100 may include a computing system 105, a data management system (DMS)

110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

The DMS 110 may support one or more applications, which may analyze data stored by the DMS 110 and may generate metadata based on such analysis. Metadata generated by such applications may indicate, for example, sensitive data types, an indication of suspicious data, other types of metadata, or any combination thereof. The metadata may be hierarchical in nature (e.g., may relate to various files and directories that may depend from one another in a hierarchical fashion). The metadata may be associated with snapshots 135 obtained by the DMS 110, such that the metadata may be immutable and may not change over time, and thus some indexing techniques (e.g., techniques designed to support indexing of dynamically changing information) may involve unnecessary and undesirable complexities. Additionally, some current systems may not support aggregation and filtering of hierarchical metadata across various parameters.

Techniques described herein provide for the DMS 110 to efficiently index the metadata generated by various applications on a per-snapshot 135 basis using bitmap and bit slice indexing techniques. The bitmap and bit slice techniques may be compatible with the immutable snapshot metadata, and may support aggregation and filtering of hierarchical data across various parameters. Thus, a user may request to view certain types and portions of the metadata by filtering the metadata over various parameters.

The DMS 110 may obtain a snapshot 135 of a filesystem and may provide the snapshot 135 to one or more applications (e.g., malware scanning applications, data classification applications). The applications may execute at the computing system 105, in the cloud environment 195, within the DMS 110, or in some other location in the computing environment 100. The applications may generate metadata associated with the snapshot 135. The DMS 110 may generate some common index information that indexes all metadata associated with the snapshot 135 and some per-application index information that indexes application-specific metadata. The common index information may include information that indexes the metadata over a namespace of the filesystem and indexes the metadata over a hierarchy associated with the filesystem. The DMS 110 may store the generated index information in an index registry. When the DMS 110 receives metadata from an application, the DMS 110 may first scan the index registry to determine whether common index information is already present for the metadata. If not, the DMS 110 may generate and store the common index information. The DMS 110 may subsequently generate and store the per-application index information in the index registry. The per-application index information may include information that indexes the metadata across one or more terms (e.g., a sensitive data term or other term) and one or more numerical values (e.g., a count index).

A client of the DMS 110 may transmit, via a user interface, a request to view certain data associated with their filesystem. For example, the client may request to view sensitive data stored within any folders under a first file path in the file system. The DMS 110 may utilize the index information stored in the index registry to identify and retrieve the requested data. For example, the DMS 110 may scan the index registry for the requested file path and may filter by the requested term (e.g., sensitive data) and the hierarchical indexes associated with the requested file path. The index information may be stored in the form of bitmaps and bit slices, such that the DMS 110 may efficiently compare and process the index information to identify the correct data. The DMS 110 may output the requested data to the client.

Figure 2:
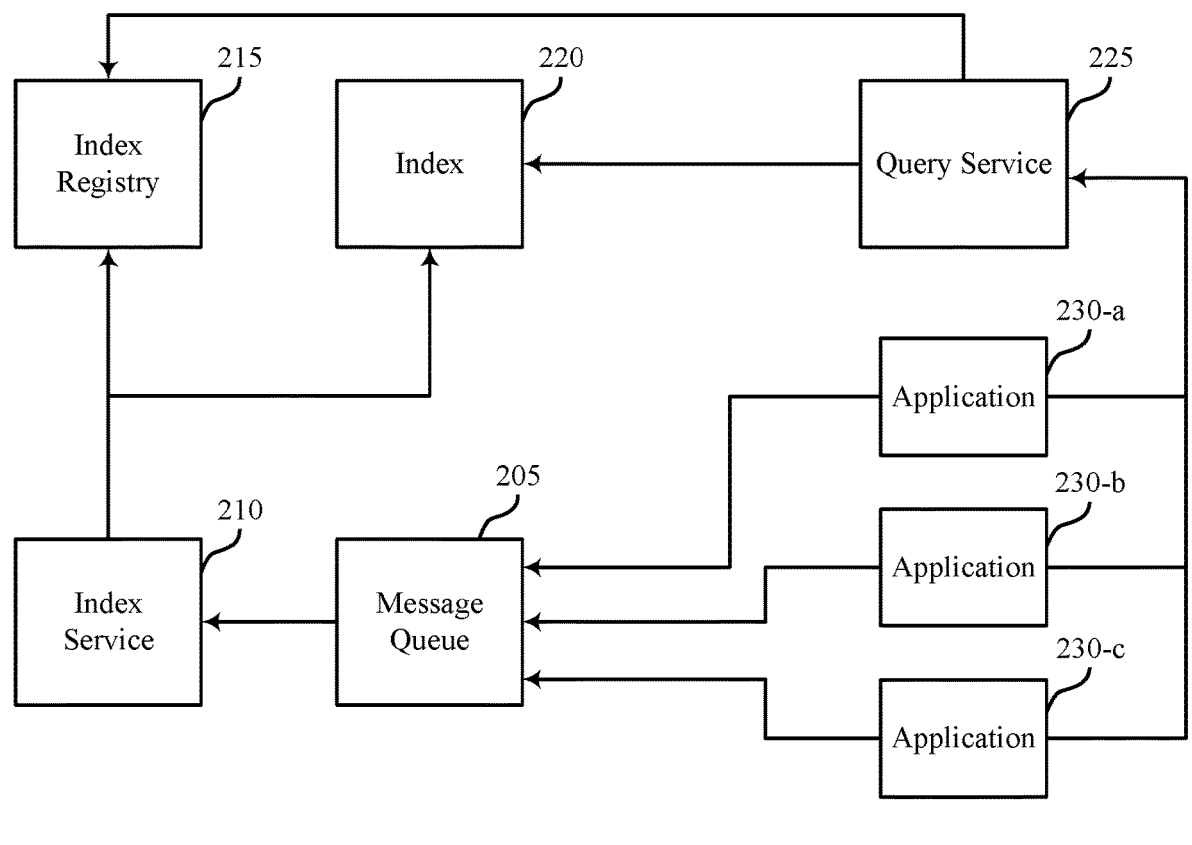
FIG. 2 shows an example of a data management system (DMS) architecture that supports metadata search, filtering, and aggregation using indexes in accordance with aspects of the present disclosure.

FIG. 2 shows an example of a DMS architecture 200 that supports metadata search, filtering, and aggregation using indexes in accordance with aspects of the present disclosure. The DMS architecture 200 may implement or be implemented by aspects of the computing environment 100 described with reference to FIG. 1. For example, the DMS architecture 200 illustrates one or more components that may be located in, may execute at, or may otherwise be in communication with a DMS, which may represent an example of the DMS 110 as described with reference to FIG. 1. In this example, the DMS may facilitate efficient indexing of data stored by the DMS.

As described with reference to FIG. 1, the DMS may obtain one or more snapshots of client data. The DMS may obtain the snapshot and store the snapshot in a storage location at the DMS or coupled with the DMS. In some examples described herein, when the DMS obtains a snapshot, the DMS may perform indexing to index the snapshot data. For example, in response to (e.g., at the same time as, at least partially overlapping with, or after) obtaining the snapshot, the DMS may generate namespace index information and hierarchical index information for the snapshot data.

The DMS may support one or more applications 230 (e.g., applications 230-a, 230-b, and 230-c). The applications 230 may be security-type applications or other types of applications (e.g., malware scanning applications, data classification applications) that may execute on the DMS or on another component that is coupled with the DMS. The applications 230 may scan the snapshot data stored by the DMS and may generate metadata based on the snapshot data. The metadata may indicate, for example, one or more terms or numerical values included in the snapshot data. The applications 230 may execute asynchronously, in some examples. For example, the application 230-a may scan the snapshot data and generate metadata at a first time and the application 230-b may scan the snapshot data and generate metadata at a second time different than the first time. The applications 230 may output the generated metadata to the message queue 205 as an index-building message.

In some examples, the applications 230 may trigger an index-building process by sending a build index message to the message queue 205. The index service 210 may include an index builder, which may monitor the message queue 205, process any index-building messages that indicate or request index building, and acknowledge the message after successfully indexing the requested data. In some examples, the DMS may support one or more multiple replicas of the index service 210 based on a load supported by the index service 210.

As described herein, the build index message may include a name of an index information group (e.g., a column group name), a source file path, an accessor name, or any combination thereof. The name of the index information group may uniquely identify a column group. The index service 210 may be configured with a deserializer for each column group and may deserialize the source files accordingly. The source file path may indicate a path to one or more source files that were used to generate the corresponding metadata to be indexed. The accessor name may indicate an accessor, which may be an interface or a schema that is operable to extract a value from a deserialized structure. The extracted value will be indexed. That is, the accessor may take deserialized data and may output one or more types of data structures that are supported by the index service 210 for indexing (e.g., Boolean values, strings, list of strings, integers, or the like) along with a column name. For example, an accessor for an application 230 that supports suspicious data analysis may take a deserialized structure and may output a column named "suspicious data column," or the like. The information output from the accessor is sent to the index builder which builds the index for the corresponding column accordingly. The accessor may thereby interface between source data and the index builder to ensure that the index generation occurs smoothly across various different types of applications 230.

Creating a new index may include generating the namespace and hierarchical index information, along with writing a corresponding index descriptor for the snapshot as described herein. In some examples, one of the applications 230 may trigger the new index creation by, for example, generating a first set of metadata for a snapshot before the index service 210 has indexed the snapshot. In such cases, the index service 210 may generate a column group for the application 230 along with the snapshot-common index information (e.g., the namespace and hierarchical index information).

In some examples, to ensure that index writes and modifications are atomic in nature, a new index-building process may acquire a lock by writing a lock file on a storage for the index information. The index service 210 may proceed with generating the new index if the lock is successfully acquired. Otherwise, the index service 210 may retry the attempt with backoff. The lock may be released by deleting the lock file after the index generation has finished. The lock may have a timeout so that if the index building process crashes without releasing the lock, the index may be released after the timeout.

To build a new index, the index service 210 may consume the build index message, then iterate through the identified source file to obtain a key-value pair. The iteration may include deserializing a value for each row in the source file using a deserializer for the column group, using the accessor for the column group to get the value of columns that need to be indexed, inserting the key into namespace, hierarchical, and key search index builders, and then using the accessor value to create column group term and count indexes. Once the iteration is complete (e.g., all rows of the source files have been indexed), the index may be generated and a corresponding index descriptor that identifies the index information may be written to the index registry 215. In some examples, each column group may be associated with a respective index specification. The index specification may include information that indicates, for the associated column group, how the index service 210 is to deserialize the source files and what columns to index from a deserialized row. For example, the index specification may include an accessor map that maps accessor names to accessor implementations and a deserializer map that maps the column group names to deserializer implementations.

To generate the namespace index information, the index service 210 may scan a namespace of the snapshot (e.g., a range of addresses associated with the snapshot data). The index service 210 may generate, for each file in the data, a respective entry in a set of namespace index information. The entry may include an identifier (ID) of the file, a path of the file, and one or more other types of information (e.g., a time associated with the file, a size of the file). The index service 210 may similarly generate, for each path in the snapshot, a respective entry in a set of hierarchical index information. Each entry in the hierarchical index information may include a depth of the path in a hierarchy of data files in the namespace, the path of the file, and a bitmap that indicates IDs of one or more other files that depend from the file in the hierarchy. The hierarchical index information and the namespace index information may be described in further detail elsewhere herein, including with reference to FIGS. 4A and 4B.

The index service 210 may store the namespace index information and the hierarchical index information. The namespace index information and the hierarchical index information may be common across multiple applications 230 supported by the DMS. For example, the namespace index information and the hierarchical index information may be common for all data included in the snapshot. The index service 210 may generate and store the various different types of index information described herein in a table format (e.g., blob tables) or some other format for storage by the DMS. The index service 210 may additionally generate an index descriptor that provides references to the various types of index information. The index descriptor may be stored in the index registry 215, in some examples, and may be described in further detail elsewhere herein, including with reference to FIG. 3.

As described herein, the DMS may generate additional index information based on the metadata generated by each application 230. The DMS may generate the additional index information on a per-application basis, and the application-specific index information may be associated with a respective index information group, which may be referred to as a column group, in some examples. For example, the message queue 205 may receive metadata from an application 230, and the index service 210 may monitor (e.g., listen to) the message queue 205 periodically. The index service 210 may obtain the metadata from the message queue 205 for indexing (e.g., via an index-building message, or some other type of message that indicates the metadata to be indexed). The index service 210 may scan the index registry 215 to determine whether the snapshot has already been indexed (e.g., whether the index registry 215 includes an index descriptor for the snapshot). If the snapshot has already been indexed, the index service 210 may add a new column group to the index descriptor and generate corresponding application-specific index information by reusing the existing namespace. If the snapshot has not been indexed, the index service 210 may generate a new index for the snapshot, as described above.

The index service 210 may scan the application-specific metadata and generate additional index information for the snapshot based on the metadata. In some examples, the index service 210 may transmit an acknowledgment to the message queue 205 if the index service 210 successfully indexes the metadata and writes a corresponding index descriptor that identifies the index information. If the index service 210 is unable to successfully index the metadata and/or write the index descriptor, the index service 210 may transmit a negative acknowledgment to the message queue 205 to request a retry of the indexing. Any index information that was created and is unreferenced during a failed indexing attempt may be cleaned up and removed via a subsequent garbage collection process.

The application-specific index information may include term index information and count index information. To generate the term index information, the index service 210 may generate, for each term that is included in the metadata, a respective bitmap that indicates one or more data paths in the snapshot that include the term. A term as described herein may refer to a type of data, an extension of a data path, a file name, a data path ID, an operation type, an analyzer, or the like. For example, a term may represent a sensitive data term, or some other type of data. To generate the count index information, the index service 210 may generate, for each term within the snapshot, a respective bit slice that represents numerical data associated with the term in the snapshot, as described in further detail elsewhere herein, including with reference to FIG. 5B. The index service 210 may generate the term and count index information similar to the namespace and hierarchical information by, for example, iterating over one or more source files, deserializing each row, utilizing an accessor to get the term and count information, and then adding entries to the term and count index tables.

The index service 210 may store the count index information and the term index information. The index service 210 may utilize the index component 220 to generate the count and term index information. In some examples, the index service 210 may store the count and term index information at the index component 220. Additionally, or alternatively, the count and term index information may be stored in the index registry or at another object storage location. In some examples, the count and term index information may be stored with (e.g., mapped to) an index group ID that may identify the application. The index group ID may indicate that the count and term index information are specific to the application and the corresponding metadata generated at a certain time. In some examples, the index service 210 may write to an existing index descriptor for the snapshot. For example, the index service 210 may add the term and count indexes to the index descriptor with the column group ID, as described in further detail elsewhere herein, including with reference to FIG. 3.

After generating first count and term index information for a first application 230-a, the index service 210 may subsequently receive metadata from one or more other applications 230-b and 230-c. The index service 210 may similarly scan the index registry 215 for the snapshot common index information, then generate application-specific count and term index information for each application. All of the index information may be stored and pointed to by an index descriptor for the snapshot.

The DMS may thereby generate index information on a per-snapshot basis. In some examples, the DMS may perform a similar process to generate index information for a different snapshot. The index information generation performed by the index service 210 for a given snapshot may include creating a new index for the snapshot, adding a column group to an existing index, or re-indexing a snapshot.

Re-indexing a snapshot may include regenerating a namespace if a namespace has already been indexed and stored, and application metadata contains keys outside of the namespace (e.g., files from a previous snapshot which were deleted in the current snapshot, etc.). The index regeneration may be performed using the source files for all of the column groups. This may be done by storing paths to the source files in the index descriptor so the source files may be reused if required. The namespace, hierarchical index information, key search information, and all column group indexes may be regenerated based on the source files. The namespace, hierarchical, and key search indexes may be regenerated using a union of keys from the source files for all column groups. For example, a union iterator may iterate over keys of all the source files (e.g., without deserializing the values of the source files). As such, the complete namespace may be obtained and indexed. Then, the column group indexes may be regenerated using a similar process that is used to add a new column group to an existing namespace.

The index service 210 may thereby generate and store index information associated with a snapshot and including common index information as well as column group-specific index information. The index information may be stored in a key-value storage that may be optimized for storage and retrieval of data with a relatively minimal footprint. The index information may be identified by an index descriptor stored at the index registry 215.

A user of the DMS may transmit, to the DMS via a user interface, a query that requests access to a certain group of data from the snapshot. The query service 225 may be a component within the DMS that is configured to receive, decode, and manage responses to the user queries. A query request may specific one or more IDs of an account, a snappable, a snapshot, and an index category to be queried. The query service 225 may perform a query in response to the request. The query operation may include one or more portions, including a select portion, an aggregation portion, a filter portion, and a sorting portion, or any combination thereof.

The select portion may include identifying a list of columns to be selected and returned in the result. Column names may be specified as the name of the accessors which were provided while building the index. For selecting columns that do not require any aggregation (or were not indexed), the query may include the accessor name and query the column value from the source file used to create the index. The query service 225 may thereby determine and segregate indexed columns from un-indexed columns to process each part separately and later merge a final result.

The aggregation portion may aggregate data on one or more column values. For example, if the query requests includes a request to aggregate data, the query service 225 may utilize the count index information including bit slices to facilitate the aggregation across one or more filtered ranges, as described in further detail elsewhere herein, including with reference to FIG. 5B. The aggregation may be a sum operation, a minimum or maximum operation, an average operation, or any combination thereof.

The filter portion of the query including filtering on one or more column values using bitmap indexes. For example, if a query requests for a filter of data over one or more terms, the query service 225 may utilize the term index information including bitmap indexes to identify the filtered data, as described in further detail elsewhere herein, including with reference to FIGS. 5A and 5B.

The sorting portion may include a combination of one or more different queries or algorithms. For example, sorting may be implemented by a combination of range query and top K query. The query service 225 may first use the range query to get a result set that is greater than (or lesser than) a last value on a previous page. The query service 225 may subsequently perform a top K query with the page size to get the current page, such that the page data may be sorted accordingly. Sorting all entries in an index may be relatively complex and expensive. As such, the top K algorithm identifies the top K entries in an index, and the range query or other queries may then sort within those entries. Techniques described herein provide for sorting operations that support negative integers.

To serve a query request, the query service 225 may obtain the index descriptor from the index registry 215 and may load the index. The query service 225 may subsequently fetch appropriate index information (e.g., bit slice and bitmaps) into memory for the corresponding filter and/or aggregation queries. The query service 225 may perform logical operations on the index information to obtain a result set, which may include one or more ranks, and the query service 225 may utilize the namespace index information to translate the ranks into data paths within the snapshot, as described in further detail elsewhere herein, including with reference to FIG. 5B. In some examples, if the select portion of the query identifies any non-indexed columns, the query service 225 may utilize one or more source files identified in the index descriptor to retrieve such portions of data. The query service 225 may subsequently return the results. For example, the query service 225 may output one or more identified data paths, numerical values, terms, or any combination thereof to a user via the user interface.

The DMS may thereby generate multiple types of index information and may store an index descriptor that uniquely organizes, defines, and points to the various types of index information. As such, when the DMS receives a query request, the DMS may utilize the index descriptor to efficiently retrieve relevant index information and facilitate a response to the query. Additionally, or alternatively, the index information may be in the form of bitmaps and bit slices, which may support relatively efficient and accurate aggregation, sorting, filtering, and ranging of corresponding data, as described herein.

Figure 3:
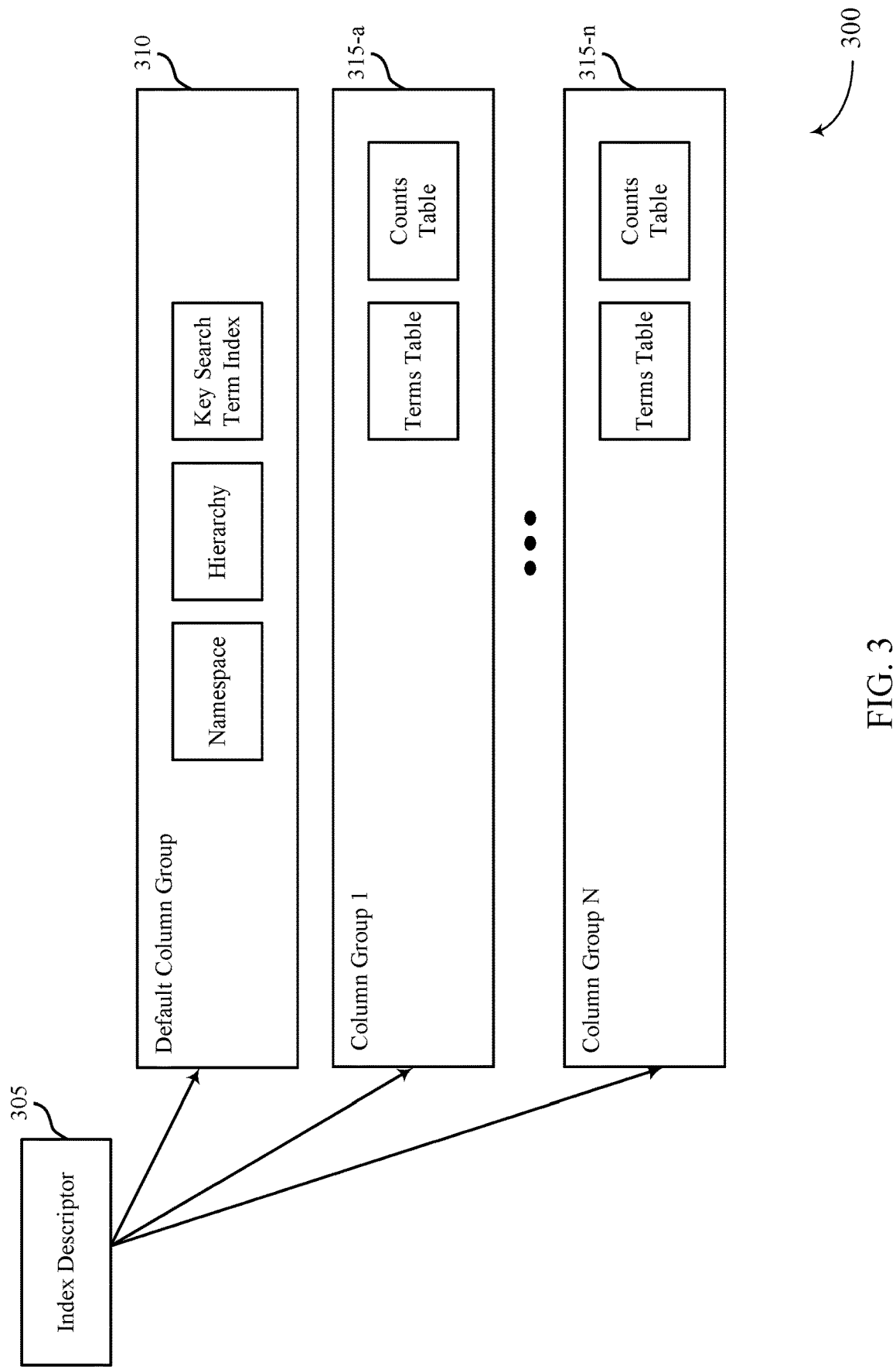
FIG. 3 shows an example of an index descriptor configuration that supports metadata search, filtering, and aggregation using indexes in accordance with aspects of the present disclosure.

FIG. 3 shows an example of an index descriptor configuration 300 that supports metadata search, filtering, and aggregation using indexes in accordance with aspects of the present disclosure. The index descriptor configuration 300 may implement or be implemented by aspects of the computing environment 100 and the DMS architecture 200. For example, the index descriptor configuration 300 includes an index descriptor 305, which may be generated by an index service and stored within an index registry, such as the index service 210 and the index registry 215 described with reference to FIG. 2. The index descriptor 305 may identify or point to various sets of index information for a given snapshot.

The index descriptor 305 may point to or identify various different groups of index information for the snapshot. For example, the index descriptor 305 may point to a default column group 310 and one or more other column groups 315 (e.g., 315-a through 315-n). Each of the default column group 310 and the other column groups 315 may represent a group of one or more tables that are generated and stored by the DMS.

The default column group 310 may include index tables that are common across all column groups 315 within a snapshot. The default column group 310 includes index information that is created when an index is first created for a snapshot. For example, the default column group 310 includes the namespace index information and the hierarchical index information, as described with reference to FIG. 2. The default column group 310 may additionally include a key search term index, which may include a term index to support search operations on keys within the namespace. The key search term index may be generated by tokenizing the keys in the namespace into strings and generating bitmap indexes for all the tokens. The key search term index may be generated along with the namespace and hierarchical indexes. The index descriptor 305 may thereby point to the location of each of the namespace index information, the hierarchical index information, and the key search term index information within storage.

The index descriptor 305 may additionally point to one or more column groups 315. Each column group 315 may be associated with a respective column group index and may include additional term index information and count index information for the snapshot. As described with reference to FIG. 2, the column group key space may be a subset of the index key space, which provides for the column groups 315 to be added to an existing index without regenerating the index for the snapshot.

In some examples, the index descriptor 305 may point to one or more source file paths. For example, the index descriptor 305 may include a map of a column group name to one or more source files which were used to construct the indexes for that column group. The information about source files may be used in select queries and index regeneration, where the DMS may reference data from column groups that has not yet been indexed.

The index descriptor 305 may thereby provide a description that points to all index information for a given snapshot. The index descriptor 305 may be loaded by the query service to fulfill queries by one or more applications, as described with reference to FIG. 2. The index descriptor 305 may uniquely identify an index for a given account, snappable, snapshot, or other category.

FIGS. 4A and 4B show examples of index formats 400 that support metadata search, filtering, and aggregation using indexes in accordance with aspects of the present disclosure. The example index formats 400 may implement or be implemented by aspects of the computing environment 100, the DMS architecture 200, and the index descriptor configuration 300. For example, the index formats 400-*a* and 400-*b* may represent example formats for generating and storing namespace and hierarchical index information for a snapshot, as described with reference to FIGS. 2 and 3.

The namespace index information 405 and the hierarchical index information 410 may be common to a snapshot. For example, the DMS (e.g., an index service) may generate the namespace index information 405 and the hierarchical index information 410 once per snapshot, and the namespace index information 405 and the hierarchical index information 410 may be common across multiple column groups. The namespace index information 405 and the hierarchical index information 410 may be identified by an index descriptor, as described in further detail elsewhere herein, including with reference to FIG. 3.

The index information may be stored in a table format, which may be an abstraction for a data repository used in indexes. For example, the table format may be a key-value store, which may provide methods to efficiently seek a key and methods to iterate over the table. In some examples, the table may be a ranked table. Rank may refer to a position of an entry in an ordered table, starting with zero. A ranked table may provide for a DMS to search by rank. In some examples, there may be a single table for namespace index information 405 per snapshot and a single table for hierarchical index information 410 per snapshot, and the index descriptor may identify the different column groups.

FIG. 4A illustrates a first example index format 400-*a*. The example index format 400-*a* illustrates an example of namespace index information 405 for a snapshot. The namespace index information 405 may be stored in a table format sorted by a Path key, which may include all files and directories in the snapshot.

To generate the namespace index information 405, the index service may iterate through all files and directories in a snapshot and include a new entry for each new file or directory. In the example illustrated in FIG. 4A, the file 3 may include its own entry, while the files 1 and 2, which may be under or included in a directory, may each include their own entry.

The file and/or directory may be listed in the Path column. An ID for each file and directory may be defined in the ID column based on the rank of the corresponding file and/or directory in the table. That is, the keys may be listed in lexicographic order. For example, the path/dir/file1 illustrated in FIG. 4A may be the first entry in the table, and may be assigned an ID of 0 accordingly.

The DMS may store, in the values for each entry in the table, column data, including unindexed data. Such data may include, for example, a time associated with the file or directory (e.g., a creation date and time), a sized of the file or directory, other information associated with the file or directory, or any combination thereof.

The namespace index information 405 may thereby be stored as multiple entries in a table, where each entry is stored as a respective key, value format. The key may be the path and/or an ID of the path and the value may be the corresponding data structure that indicates data included in the path or metadata that defines one or more characteristics of the path (e.g., Key: <path>, Value: <serialized structure>). The index information may be used to serve prefix queries, among other types of queries.

FIG. 4B illustrates a second example index format 400-*b*. The second example index format 400-*b* illustrates an example of hierarchical index information 410 for a snapshot. The hierarchical index information 410 may be stored in a table format or some other format, such as a denormalized layout to efficiently facilitate directory content listing operations. The hierarchical index information 410 may provide a representation of a path hierarchy, which may be a hierarchy of paths (e.g., files, directories) within the snapshot.

To generate the hierarchical index information 410, the index service may iterate through all files and directories in the snapshot and may include a new entry for each new file or directory in the hierarchical index information 410. The index service may iterate through a path hierarchy of the snapshot. The path hierarchy may represent a hierarchy of paths of data. For example, a first directory or path may be at the top of the hierarchy and may include all other paths and files in the snapshot. A next level or layer of the hierarchy may include one or more second directories or files that are included in the first directory or path. A subsequent layer may include one or more third directories or files that are included in a directory or file from the second layer, and so on. A depth of a file in the path hierarchy may correspond to which level of the path hierarchy the file is included in. By iterating through the path hierarchy, the index service may generate and store the hierarchical index information 410 in ascending depth order.

Each entry in the hierarchical index information 410 may include an ID or name of the path and a corresponding depth value that indicates a depth of the data path in the path hierarchy. The data path ID and corresponding depth value may represent a key for the entry. A value of each entry may include a range of child IDs that may represent paths from the namespace index that are included in or below the corresponding data path in the path hierarchy. They keys may be stored within the table in ascending depth order (e.g., level order). The key-value pair may thereby be Key: <depth::path>, Value: <serialized children range>, for example. In some examples, the value may additionally include one or more other types of information, such as a size or pre-file ID ranges (e.g., precomputed static aggregations).

In the example of FIG. 4B, the first path in the hierarchy may be labeled "/" and may be at a first level of the path hierarchy (e.g., a highest level) associated with a smallest depth value of zero. The first path may thereby include all of the other paths. As such, the child ID range may include all of child IDs 0-2. These IDs may refer to the IDs for the paths as identified in the namespace index information 405, in some examples. As the index service iterates through the path hierarchy, a next path in the hierarchy may be the path labeled "/dir/" which may be at a second level of the hierarchy associated with a second depth value of one. This path may include two other paths, as identified by the child ID range of 0-1. The path labeled "/file3" may also be at the second level associated with the depth value of one. This path may include a single child, as identified by the child ID range of 2. A final level of the path hierarchy in this example may be associated with a depth value of two and may include the/dir/file1 and the/dir/file3 paths.

The hierarchical index information 410 may thereby index the snapshot data over a path hierarchy, which may efficiently facilitate directory content listing operations. The DMS may generate and store the namespace index information 405 and the hierarchical index information 410 for the snapshot. The namespace index information 405 and the hierarchical index information 410 may be identified by one or more entries in a common column group within an index descriptor for the snapshot, as described in further detail elsewhere herein, including with reference to FIG. 3. The DMS may utilize the common index information to facilitate one or more queries for data stored in the path hierarchy within the snapshot.

For example, the DMS may utilize the hierarchical index information 410 to support one or more hierarchical queries. A hierarchical query may request to view all data under a given directory or path within a namespace. The hierarchical query may be useful in supporting filesystem browse operations, among other examples. A hierarchical query may indicate a certain depth within the path hierarchy. To perform a hierarchical query, the DMS may identify the requested depth and/or a requested directory or file in the table of the hierarchical index information 410, and the DMS may retrieve the ranges of all the children under the requested depth and/or directory. In the example of FIG. 4B, the DMS may receive a request to fetch all children within the "/dir/." The DMS may first identify all elements at depth 2 with a prefix of "/dir/" in the hierarchical index information 410 (e.g., two elements in this example). The DMS may then identify, for each element, a respective range of child IDs. The DMS may output the resulting children IDs, or the DMS may utilize the result to perform one or more filter queries, aggregation queries, or both on the children of the result, as described in further detail elsewhere herein, including with reference to FIGS. 5A and 5B.

It is to be understood that, although the example formats 400-a and 400-b illustrate example paths and corresponding values, any type or combination of paths and corresponding values may be indexed or included in the corresponding index information.

FIGS. 5A and 5B show examples of index formats 500 that support metadata search, filtering, and aggregation using indexes in accordance with aspects of the present disclosure. The example index formats 500 may implement or be implemented by aspects of the computing environment 100, the DMS architecture 200, and the index descriptor configuration 300. For example, the index formats 500-a and 500-b may represent example formats for generating and storing term and count index information for a snapshot, as described with reference to FIGS. 2 and 3.

The term index information 505 and the count index information 510 may be snapshot and application-specific. For example, each time the DMS (e.g., an index service) receives metadata from a different application, the DMS may generate the term index information 505 and the count index information 510 for the respective application. Thus, the term index information 505 and the count index information 510 may be associated with certain column groups, as described with reference to FIGS. 2 and 3. The term index information 505 and the count index information 510, along with their respective column groups, may be identified by an index descriptor, as described in further detail elsewhere herein, including with reference to FIG. 3.

The index information may be stored in a table format, which may be an abstraction for a data repository used in indexes. For example, the table format may be a key-value store, which may provide methods to efficiently seek a key and methods to iterate over the table. In some examples, the table may be a ranked table. Rank may refer to a position of an entry in an ordered table, starting with zero. A ranked table may provide for a DMS to search by rank. In some examples, there may be a single table for term index information 505 per snapshot and a single table for count index information 510 per snapshot, and the index descriptor may identify the different column groups.

FIG. 5A illustrates a first example index format 500-a. The example index format 500-a illustrates an example of term index information 505 for a column group of a snapshot. The term index information 505 may be stored in a table format sorted by terms (e.g., an inverted index including ID bitmaps for field-term pairs).

To generate the term index information 505, the index service may scan the metadata received from an application to identify one or more terms, such as a file name, an extension, an operation type, analyzer hits, a type of sensitive or suspicious data, an encryption status, or the like. In some examples, the index service may extract the terms directly from a file path, such as a file name or extension, but other terms may be extracted from the metadata produced by the application.

The index service may generate an entry in the term index information 505 for each term. For example, a key for each entry may be the term as well as a corresponding column group. (e.g., Key: <Field::Term> where Field represents the column group). A value of each entry may be a bitmap (e.g., a roaring bitmap, or some other type of bitmap) that indicates one or more data paths that are associated with the term. For example, the bitmap may include multiple bits, and each bit position may be associated with (e.g., unique to) a respective data path in the snapshot. If the bitmap includes a bit set high in a certain position, that may identify that the corresponding data path is associated with the term. In some examples, the bitmap may be sparse in nature to reduce a size of the bitmap and the term index information 505. A data path may be associated with the term if the data path includes the term (e.g., a certain type of data, an analyzer hit, an operation type) or if the data path is identified by the term (e.g., file name, extension, or the like).

The term index information 505 may support filtering by the DMS. For example, if the DMS receive a query to filter data for a certain term (e.g., find encrypted files or suspicious files, or the like), the DMS may use the term index information 505 to identify the corresponding files, retrieve the data, and output the data in response to the query.

FIG. 5B illustrates a second example index format 500-b. The example index format 500-b illustrates an example of count index information 510 for a snapshot. The count index information 510 may be stored in a table format sorted by terms (e.g., column names). For example, there may be a respective entry in the count index information 510 for each column group.

To generate the count index information 510 the index service may scan the metadata received from an application to identify a set of numerical values included in or otherwise associated with the data paths in the snapshot. For example, an application may analyze snapshot data and generate numerical values associated with the snapshot data in various data paths. As an example, an application may generate metadata that indicates a quantity of sensitive hits per data path, or some other numerical term. The index service may scan the metadata and generate a bit slice that represents the numerical values for the snapshot. The bit slice may be a set of multiple bitmaps that provide a numerical representation of integer numerical values for all data paths in the namespace.

A quantity of bitmaps that are included in the bit slice may be equal to a quantity of bits in the numerical value to be represented. For example, if the numerical value includes 64 bits, there may be 64 bitmaps in the bit slice. Each bitmap may be associated with a respective bit position in the numerical value. An index (e.g., rank) in each bitmap may be set if the corresponding bit is set in the integer value for the data path that corresponds to that rank. That is, each bitmap may include a quantity of bits that is equal to or otherwise based on a quantity of data paths in the namespace, and each bit in the bitmap may identify a rank of a corresponding data path. Thus, the bitmaps as a whole may indicate which data paths include which numerical values.

The following provides an example bit slice structure for a bit slice that includes four bitmaps to represent a four-bit numerical value, such as a hit count, within a namespace including four data paths. In this example, a first data path may be associated with a hit count value of 1001, a second data path may be associated with a hit count value of 0101, a third data path may be associated with a hit count value of 0001, and a fourth data path may be associated with a hit count value of 0000. In such cases, the bit slice may include a first bitmap of {1000} to represent the first data path is the only data path in which the first bit is set, a second bitmap of {0100} to represent that the second data path is the only data path in which the second bit is set, a third bitmap of {0000} to represent that the third bit set is not set in any of the data paths have, and a fourth bitmap of {1110} to represent that the fourth bit is set within each of the first three data paths.

The DMS may thereby store term index information 505 and count index information 510, which may support queries for data. For example, if the DMS receives a filter query with a request to filter data based on one or more filter terms, the DMS (e.g., the query service 225) may retrieve, from the term index information 505 based on the index descriptor stored in the index registry, all bitmaps for the requested filter terms. The DMS may perform logical bitmap operations (e.g., AND, OR, etc.) on the term bitmaps to obtain a resulting bitmap. In some examples, the DMS may perform the logical bitmap operations over a range of IDs instead of the entire bitmap to get results in the range. For example, if the filter query requests for data associated with a certain term and further indicates a certain directory, the DMS may perform a hierarchical query to obtain a range of child IDs for the directory, as described with reference to FIG. 4B, and the DMS may apply the logical bitmap operations over the range of child IDs in the bitmap, such that the resulting bitmap may only include data in data paths that depend from the requested directory in the path hierarchy. The resulting bitmap may include a set of bits that indicate an index associated with a rank of the paths to be included in the result set. The DMS may then translate the rank to resultant paths using the namespace index. For example, the resulting bitmap may indicate IDs of one or more paths, and the DMS may use the namespace index information 405 to then identify the actual data paths by name and retrieve the data from the data path accordingly.

The DMS may additionally, or alternatively, utilize the index information to support one or more aggregation queries. An aggregation query may request an aggregation (e.g., sum) of numerical data across multiple data paths within the snapshot. For example, a user may request to view a total quantity of sensitive hits across a directory, or some other type of aggregation over a term. To perform an aggregation query, the DMS may utilize the count index information 510. For example, the DMS may retrieve or identify, from the count index information 510, a bit slice for the requested term. The DMS may identify the bit slice by using the requested term as a key to the table for the count index information 510.

To aggregate over a bit slice, the DMS may calculate, for each bit position (e.g., each bitmap), a respective quantity of bits in the corresponding bitmap that are set (e.g., to 1). The DMS may then multiply the quantity of set bits in the bitmap by a multiplication factor that is equal to two to the power of the bit position. The DMS may perform this calculation for each bit position, and may then sum the resulting values for all bit positions in the bit slice. The result may represent an aggregated numerical value over the namespace. Although described with reference to a sum, it is to be understood that aggregation may correspond to a sum calculation, a minimum calculation, maximum calculation, an average calculation, or any combination thereof.

In some examples, the DMS may support aggregation over different terms or hierarchies by combining the count index information 510 with one or more of the namespace index information 405, the hierarchical index information 410, and the term index information 505. For example, the DMS may utilize a bit slice on a desired set of ranges to perform the aggregation. The DMS may perform, for example, a hierarchical query to obtain a range of child IDs for a given directory, as described with reference to FIG. 4B, and the DMS may subsequently perform aggregation or filtering over the range of child IDs in the bitmap. Additionally, or alternatively, the DMS may perform a filtering query over a certain term, such as a sensitive data type. The DMS may obtain a bitmap that indicates data paths that include the sensitive data type based on the filtering query, and the DMS may then AND the bitmap with all of the bitmaps in the bit slice for the term before aggregating to then aggregate over all of the sensitive data types.

The DMS may additionally, or alternatively, support queries to range data. For example, the DMS may receive a range query, a top K query, a minimum query, a maximum query, or any combination thereof. A range query may request to view data paths that include data within a certain range. A top K query may request to view a certain quantity (e.g., K) of data paths that include the highest values for a given numerical term.

As described herein, the DMS may support top K queries for signed integers by using the bit slices in the count index information 510. The DMS may first convert the signed integers to an unsigned integer representation. This conversion may be done by flipping a first bit in the signed integer. In two's complement, the first bit may indicate whether a number is positive (e.g., 0) or negative (e.g., 1). By flipping the first bit, the negative numbers may come before the positive numbers in an ordered list. The DMS may pass the unsigned integer representations to a top K algorithm, and the new ordering may support accurate identification of the top K maximum values. Additionally, or alternatively, the DMS may support a reverse of the top K query (e.g., descending order) for signed integers by first subtracting each integer from a common reference value (e.g., 2**63−1 or UINT64_MAX) while ignoring a first bit used for the sign. This can be done by flipping the 2nd-64th bits in a 64 bit value, for example, but utilizing operations performed on the bitmaps may be more efficient. Thus, the larger integers may have smaller resulting values after the subtraction and the smaller integers may have larger values after the subtraction. In some examples, the DMS may additionally, or alternatively, support pagination by excluding entries which are less than or equal to or which are greater than or equal to the previous last entry. That is, the DMS may support pagination by excluding bit slice items that are lower than a threshold.

The DMS may thereby index snapshot data according to a namespace, a hierarchy, terms, and counts. The DMS may store the indexed information in a table format, where each type of index is associated with a respective table for the snapshot. The various types of indexes may support efficient and reliable filtering, sorting, and aggregation of data within the snapshot, such that the DMS may receive query requests and facilitate various types of query requests relatively efficiently.

Figure 6:
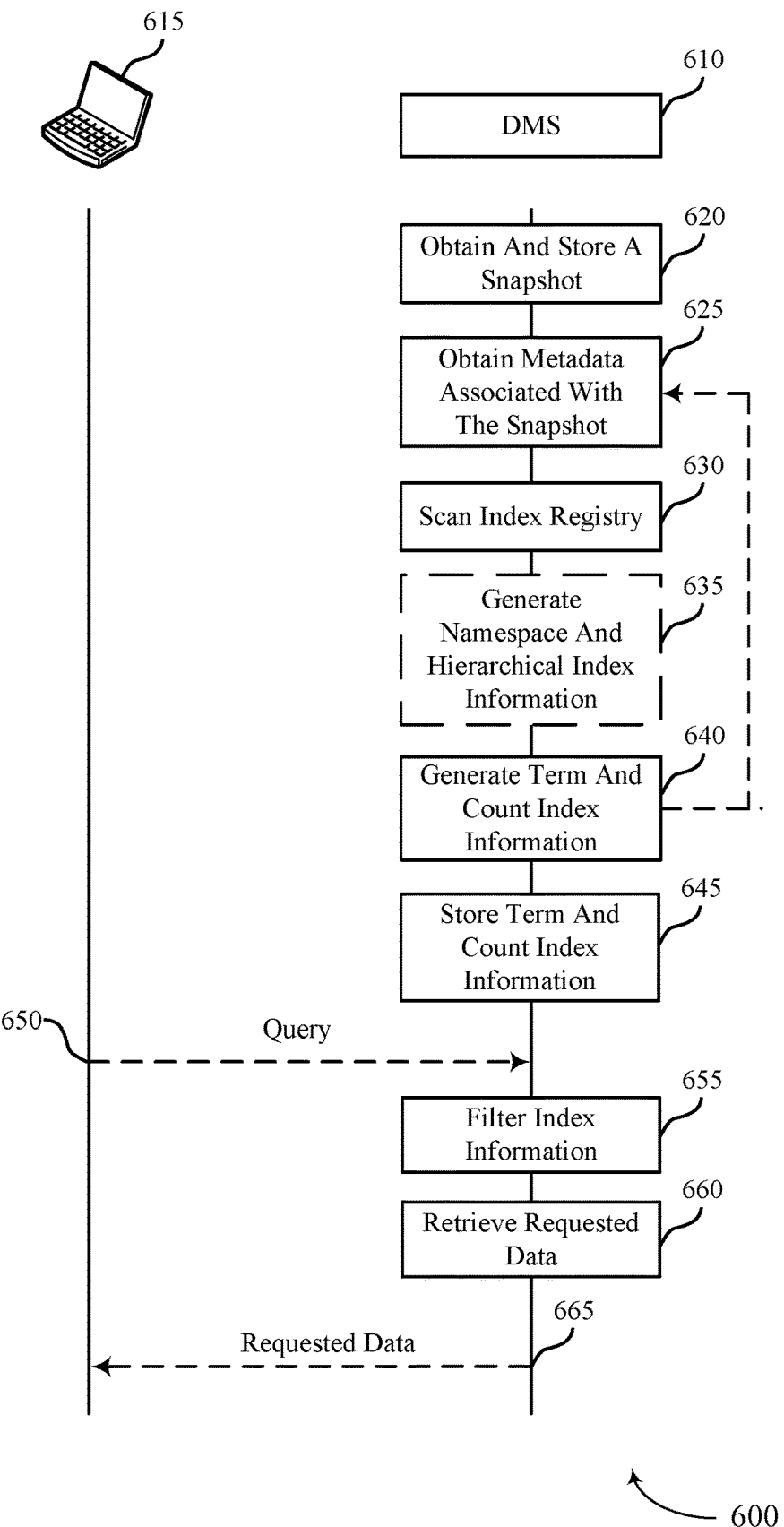
FIG. 6 shows an example of a process flow that supports metadata search, filtering, and aggregation using indexes in accordance with aspects of the present disclosure.

FIG. 6 shows an example of a process flow 600 that supports metadata search, filtering, and aggregation using indexes in accordance with aspects of the present disclosure. The process flow 600 may implement or be implemented by aspects of FIGS. 1-5. For example, the process flow 600 may be implemented by DMS 610 and a computing device 615, which may represent examples of a corresponding DMS and computing device as described with reference to FIGS. 1-5. In this example, the DMS 610 may index snapshot data and may service a query request from the computing device 615 using the indexed data, which may provide for improved efficiency and reliability of the query response.

In some aspects, the operations illustrated in the process flow 600 may be performed by hardware (e.g., including circuitry, processing blocks, logic components, and other components), code (e.g., software or firmware) executed by a processor, or any combination thereof. For example, aspects of the process flow 600 may be implemented or managed by a DMS 610, an index service component, or some other software or application that is associated with data backup and recovery.

At 620, the DMS 610 may, in some examples, obtain and store a snapshot of client data. The snapshot may represent an example of a snapshot 135 described with reference to FIG. 1.

At 625, the DMS 610 may obtain metadata associated with the snapshot. In some examples, the metadata may be obtained from (e.g., generated by) one or more applications supported by the DMS 610, such as the applications 230 described with reference to FIG. 2. For example, the applications may analyze the snapshot data and may output metadata associated with the snapshot data. In some examples, the metadata may be obtained via a message queue 205, as described with reference to FIG. 2. The applications may execute asynchronously, such that the metadata obtained at 625 may correspond to a first application.

At 630, the DMS 610 may scan an index registry at the DMS 610 for one or more IDs of one or more data paths in the snapshot. That is, the DMS 610 may determine whether the IDs of the data paths (e.g., a keyspace) has been indexed yet. If the IDs are present in the index registry (e.g., in an index descriptor within the index registry), the DMS 610 may determine that an index has been generated for the snapshot, and the DMS 610 may continue to 640. However, if the IDs are not present in the index registry (e.g., there is no ID for any data path in the snapshot), the DMS 610 may determine that an index has not yet been generated for the snapshot, and the DMS 610 may generate a new index accordingly.

At 635, in some examples (e.g., if there is not an index for the snapshot), the DMS 610 may generate a new index for the snapshot. That is, the DMS 610 may generate namespace index information and hierarchical index information for the snapshot. The namespace index information may map the data paths in the snapshot to a corresponding set of unique path IDs. The hierarchical index information may map the data paths in the snapshot to one or more descendants of the data paths in a path hierarchy associated with the snapshot. The DMS 610 may store the namespace and hierarchical index information in a data storage location and may generate an index descriptor that identifies the namespace and hierarchical index information for the snapshot, as described in further detail elsewhere herein, including with reference to FIGS. 2 and 3.

At 640, the DMS 610 may generate term and count index information for the snapshot. That is, the DMS 610 may add a column group to the index information for the snapshot. In some examples, if, at 630, the DMS 610 determines that there has not been an index built for the snapshot yet, the DMS 610 may generate the term and count index information for a first column group along with (e.g., consecutively or in at least partially overlapping processes and/or time periods) the namespace and hierarchical index information at 635. Alternatively, the DMS 610 may, at 630, determine an index is already generated for the snapshot, and may instead add the count and term index information in a new column group. The term index information may map one or more terms to corresponding data paths in the snapshot that include the one or more terms. The count index information may map the data paths in the snapshot to corresponding numerical fields using, for example bit slices, as described in further detail elsewhere herein, including with reference to FIGS. 5A and 5B.

At 645, the DMS 610 may store the term index information and the count index information in a data storage location at the DMS 610 (e.g., or coupled to the DMS 610) along with an ID of a group that indicates the term and count index information are associated with a same index information group, which may also be referred to as a column group herein. In some examples, storing the term and count index information may include storing the term and count index location in respective tables, as illustrated in FIGS. 5A and 5B, and updating an index descriptor for the snapshot to include pointers to the term and count index information within a corresponding index group, as described with reference to FIG. 3.

At 650, in some examples, the computing device 615 may transmit a query request to the DMS 610 via a user interface or other interface. The DMS 610 may receive the query request, which may request for a set of data from the DMS 610 or may otherwise request to view data that is filtered, aggregated, sorted, or the like over one or more terms.

At 655, the DMS 610 may, in response to the query request, filter the index information. For example, the DMS 610 may select which column groups and/or source files to use for obtaining the information, the DMS 610 may filter over one or more terms, the DMS 610 may aggregate one or more counts within the index information, the DMS 610 may identify a target range or set of index information, the DMS 610 may sort the index information, or any combination thereof based on the terms and other parameters indicated in the request. The format of the index information and corresponding index descriptor described herein may provide for the DMS 610 to efficiently filter the information.

At 660, the DMS 610 may retrieve the requested set of data based on the filtering. For example, the DMS 610 may filter the index information to ultimately identify a set of data paths that are requested by the computing device 615 in the query. The DMS 610 may then retrieve the data paths or relevant information associated with the data paths.

At 665, the DMS 610 may output the requested data to the computing device 615 via a user interface. The DMS 610 may thereby service the query request relatively efficiently and effectively using the index information generated by and stored at the DMS 610.

Figure 7:
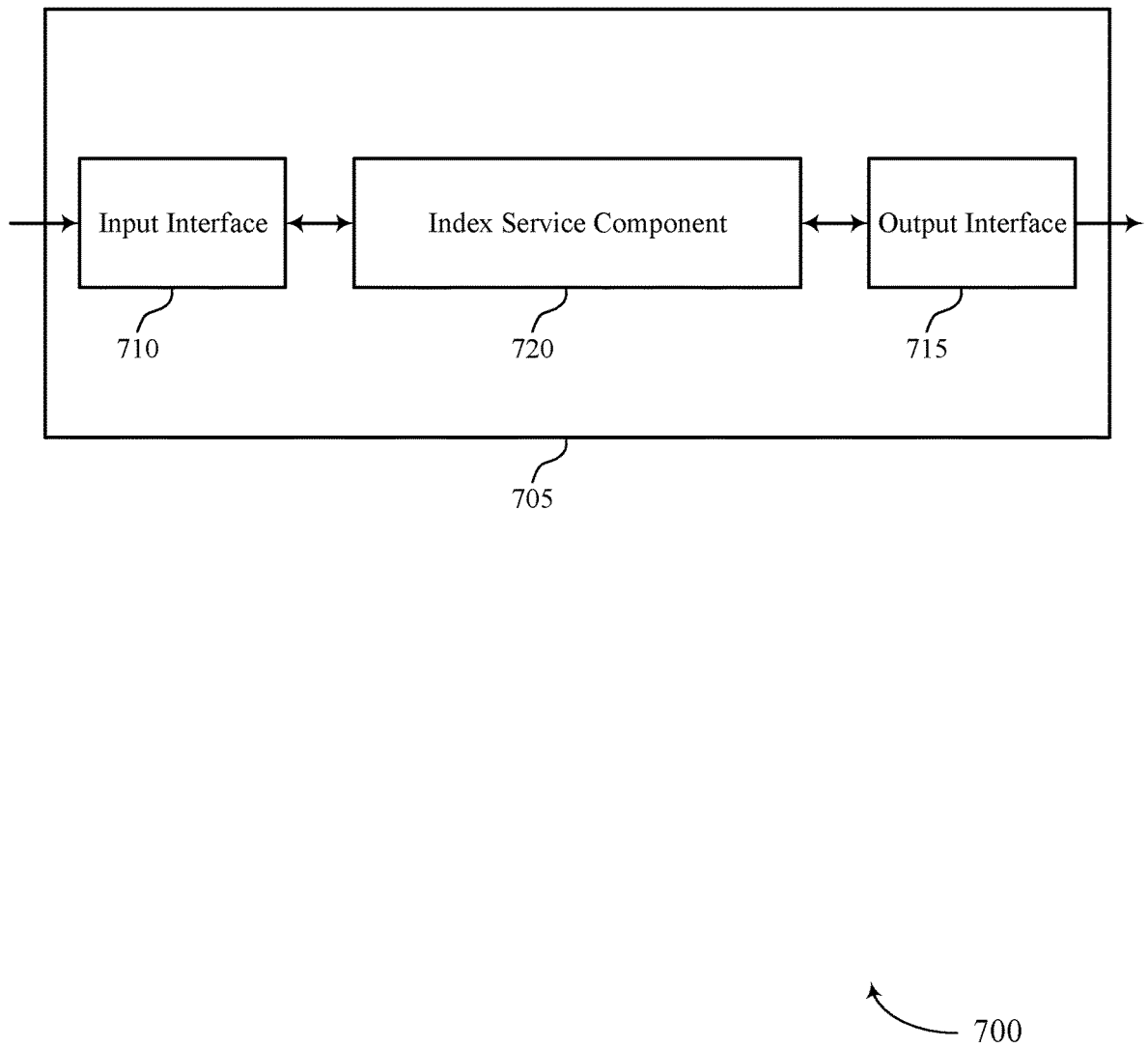
FIGS. 7 and 8 show block diagrams of devices that support metadata search, filtering, and aggregation using indexes in accordance with aspects of the present disclosure.

FIG. 7 shows a block diagram 700 of a system 705 that supports metadata search, filtering, and aggregation using indexes in accordance with aspects of the present disclosure. The system 705 may be an example of aspects of a DMS as described herein. The system 705 may include an input interface 710, an output interface 715, and an index service component 720. The system 705, or one or more components of the system 705 (e.g., the input interface 710, the output interface 715, the index service component 720), may include at least one processor, which may be coupled with at least one memory, to, individually or collectively, support or enable the described techniques. Each of these components may be in communication with one another (e.g., via one or more buses).

The input interface 710 may manage input signaling for the system 705. For example, the input interface 710 may receive input signaling (e.g., messages, packets, data, instructions, commands, or any other form of encoded information) from other systems or devices. The input interface 710 may send signaling corresponding to (e.g., representative of or otherwise based on) such input signaling to other components of the system 705 for processing. For example, the input interface 710 may transmit such corresponding signaling to the index service component 720 to support metadata search, filtering, and aggregation using indexes. In some cases, the input interface 710 may be a component of a network interface 1025 as described with reference to FIG. 10.

The output interface 715 may manage output signaling for the system 705. For example, the output interface 715 may receive signaling from other components of the system 705, such as the index service component 720, and may transmit such output signaling corresponding to (e.g., representative of or otherwise based on) such signaling to other systems or devices. In some cases, the output interface 715 may be a component of a network interface 1025 as described with reference to FIG. 10.

The index service component 720, the input interface 710, the output interface 715, or various combinations or components thereof may be examples of means for performing various aspects of metadata search, filtering, and aggregation using indexes as described herein. For example, the index service component 720, the input interface 710, the output interface 715, or various combinations or components thereof may be capable of performing one or more of the functions described herein.

In some examples, the index service component 720, the input interface 710, the output interface 715, or various combinations or components thereof may be implemented in hardware (e.g., in communications management circuitry). The hardware may include at least one of a processor, a DSP, an ASIC, an FPGA or other programmable logic device, a discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the index service component 720, the input interface 710, the output interface 715, or various combinations or components thereof may be implemented in code (e.g., as communications management software or firmware) executed by at least one processor (e.g., referred to as a processor-executable code). If implemented in code executed by at least one processor, the functions of the index service component 720, the input interface 710, the output interface 715, or various combinations or components thereof may be performed by a general-purpose processor, a DSP, a CPU, an ASIC, an FPGA, or any combination of these or other programmable logic devices (e.g., configured as or otherwise supporting, individually or collectively, a means for performing the functions described in the present disclosure).

In some examples, the index service component 720 may be configured to perform various operations (e.g., receiving, monitoring, transmitting) using or otherwise in cooperation with the input interface 710, the output interface 715, or both. For example, the index service component 720 may receive information from the input interface 710, send information to the output interface 715, or be integrated in combination with the input interface 710, the output interface 715, or both to receive information, transmit information, or perform various other operations as described herein.

For example, the index service component 720 may be configured as or otherwise support a means for obtaining, at a DMS, metadata associated with a snapshot stored by the DMS, where the metadata includes information associated with one or more data paths in the snapshot. The index service component 720 may be configured as or otherwise support a means for scanning, by the DMS and based on obtaining the metadata, an index registry at the DMS for IDs of the one or more data paths in the snapshot, where whether the IDs of the one or more data paths are present within the index registry indicates whether the index registry includes namespace index information that maps a set of multiple data paths in the snapshot to a corresponding set of multiple unique path IDs and hierarchical index information that maps the set of multiple data paths in the snapshot to one or more descendants of the set of multiple data paths in a path hierarchy associated with the snapshot. The index service component 720 may be configured as or otherwise support a means for generating, by the DMS and based on the metadata, term index information and count index information, where the term index information maps one or more terms to corresponding data paths of the set of multiple data paths in the snapshot that include the one or more terms, and where the count index information maps the set of multiple data paths in the snapshot to corresponding numerical fields. The index service component 720 may be configured as or otherwise support a means for storing, in the index registry at the DMS, the term index information, the count index information, and a group ID that indicates the term index information and the count index information are associated with a same index information group, where the namespace index information and the hierarchical index information are common to a set of multiple index information groups associated with the DMS.

By including or configuring the index service component 720 in accordance with examples as described herein, the system 705 (e.g., at least one processor controlling or otherwise coupled with the input interface 710, the output interface 715, the index service component 720, or a combination thereof) may support techniques for reduced processing and reduced power consumption when servicing query requests based on the novel indexing techniques, including indexing over a path hierarchy and storing indexes using bit slices and bitmaps, among other examples. Additionally, or alternatively, the system 705 may support techniques for improved data storage by, for example, storing index information in a key-value storage format and utilizing an index descriptor to organize and point to the index information.

Figure 8:
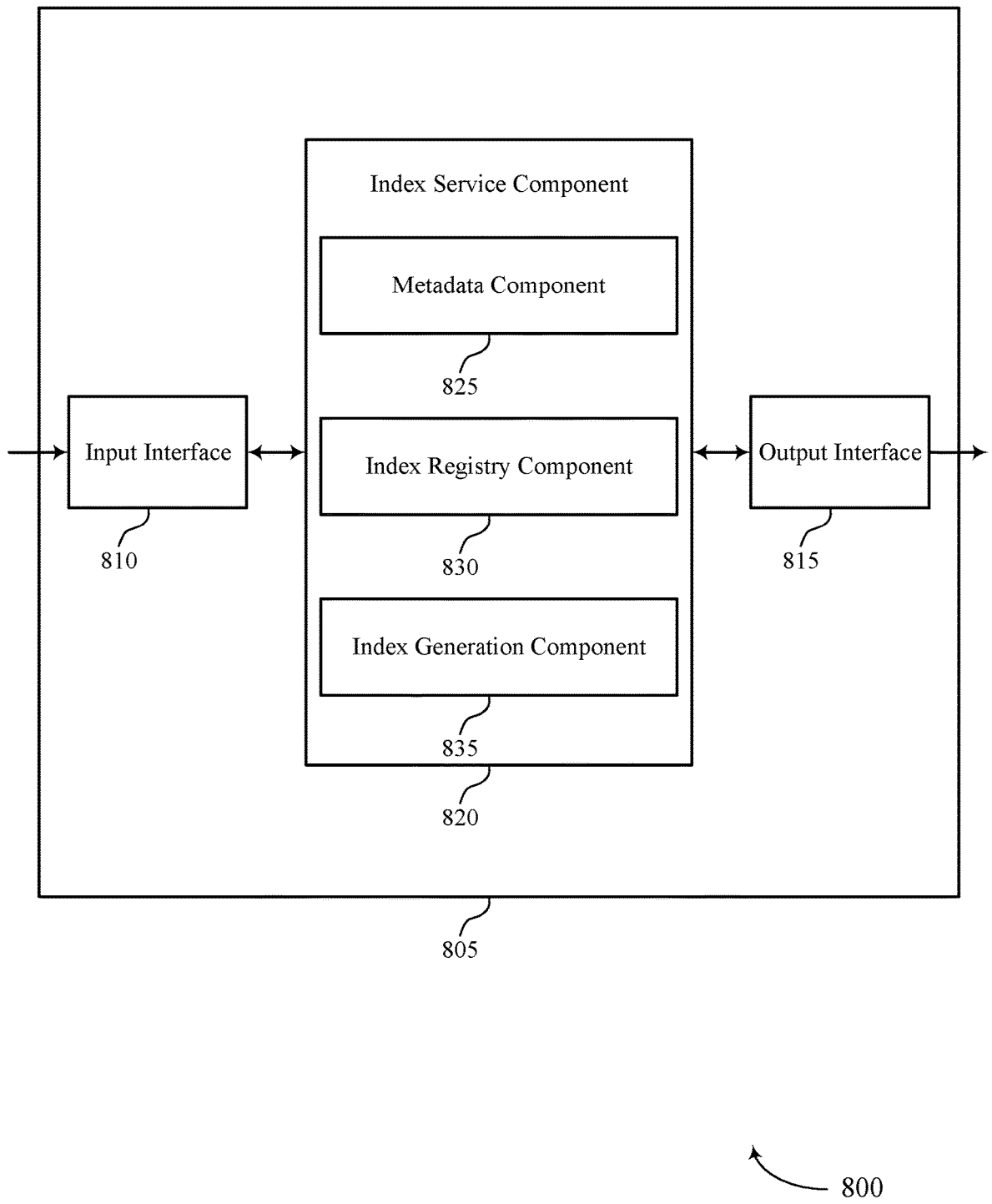

FIG. 8 shows a block diagram 800 of a system 805 that supports metadata search, filtering, and aggregation using indexes in accordance with aspects of the present disclosure. In some examples, the system 805 may be an example of aspects of one or more components described with reference to FIG. 1, such as a DMS 110. The system 805 may be an example of aspects of a system 705 or a DMS 110 as described herein. The system 805 may include an input interface 810, an output interface 815, and an index service component 820. The system 805 may also include one or more processors. Each of these components may be in communication with one another (e.g., via one or more buses, communications links, communications interfaces, or any combination thereof).

The input interface 810 may manage input signaling for the system 805. For example, the input interface 810 may receive input signaling (e.g., messages, packets, data, instructions, commands, or any other form of encoded information) from other systems or devices. The input interface 810 may send signaling corresponding to (e.g., representative of or otherwise based on) such input signaling to other components of the system 805 for processing. For example, the input interface 810 may transmit such corresponding signaling to the index service component 820 to support metadata search, filtering, and aggregation using indexes. In some cases, the input interface 810 may be a component of a network interface 1025 as described with reference to FIG. 10.

The output interface 815 may manage output signaling for the system 805. For example, the output interface 815 may receive signaling from other components of the system 805, such as the index service component 820, and may transmit such output signaling corresponding to (e.g., representative of or otherwise based on) such signaling to other systems or devices. In some cases, the output interface 815 may be a component of a network interface 1025 as described with reference to FIG. 10.

The system 805, or various components thereof, may be an example of means for performing various aspects of metadata search, filtering, and aggregation using indexes as described herein. For example, the index service component 820 may include a metadata component 825, an index registry component 830, an index generation component 835, or any combination thereof. The index service component 820 may be an example of aspects of an index service component 720 as described herein. In some examples, the index service component 820, or various components thereof, may be configured to perform various operations (e.g., receiving, monitoring, transmitting) using or otherwise in cooperation with the input interface 810, the output interface 815, or both. For example, the index service component 820 may receive information from the input interface 810, send information to the output interface 815, or be integrated in combination with the input interface 810, the output interface 815, or both to receive information, transmit information, or perform various other operations as described herein.

The metadata component 825 may be configured as or otherwise support a means for obtaining, at a DMS, metadata associated with a snapshot stored by the DMS, where the metadata includes information associated with one or more data paths in the snapshot. The index registry component 830 may be configured as or otherwise support a means for scanning, by the DMS and based on obtaining the metadata, an index registry at the DMS for IDs of the one or more data paths in the snapshot, where whether the IDs of the one or more data paths are present within the index registry indicates whether the index registry includes namespace index information that maps a set of multiple data paths in the snapshot to a corresponding set of multiple unique path IDs and hierarchical index information that maps the set of multiple data paths in the snapshot to one or more descendants of the set of multiple data paths in a path hierarchy associated with the snapshot. The index generation component 835 may be configured as or otherwise support a means for generating, by the DMS and based on the metadata, term index information and count index information, where the term index information maps one or more terms to corresponding data paths of the set of multiple data paths in the snapshot that include the one or more terms, and where the count index information maps the set of multiple data paths in the snapshot to corresponding numerical fields. The index registry component 830 may be configured as or otherwise support a means for storing, in the index registry at the DMS, the term index information, the count index information, and a group ID that indicates the term index information and the count index information are associated with a same index information group, where the namespace index information and the hierarchical index information are common to a set of multiple index information groups associated with the DMS.

Figure 9:
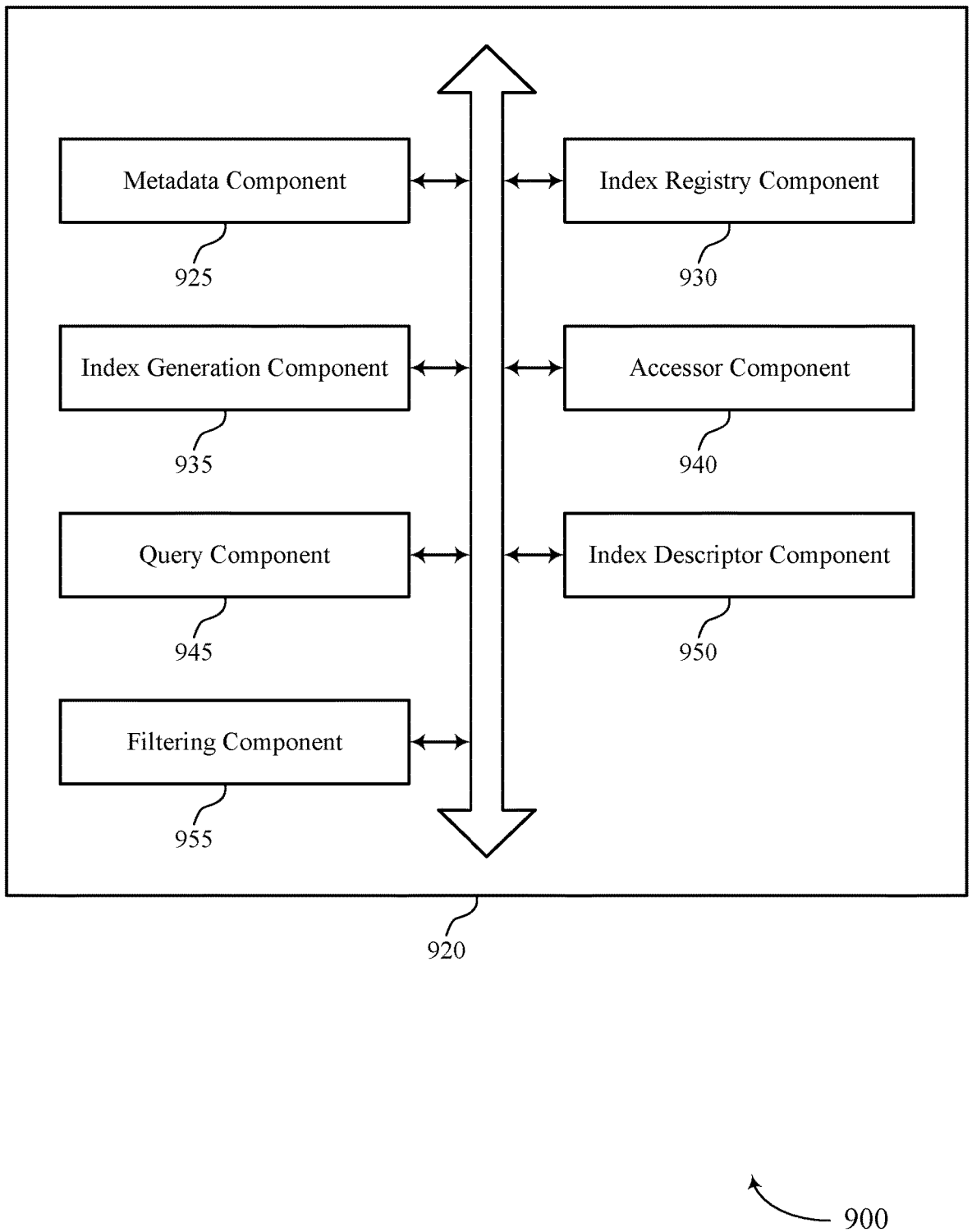
FIG. 9 shows a block diagram of an index service component that supports metadata search, filtering, and aggregation using indexes in accordance with aspects of the present disclosure.

FIG. 9 shows a block diagram 900 of an index service component 920 that supports metadata search, filtering, and aggregation using indexes in accordance with aspects of the present disclosure. The index service component 920 may be an example of aspects of an index service component 720, an index service component 820, or both, as described herein. The index service component 920, or various components thereof, may be an example of means for performing various aspects of metadata search, filtering, and aggregation using indexes as described herein. For example, the index service component 920 may include a metadata component 925, an index registry component 930, an index generation component 935, an accessor component 940, a query component 945, an index descriptor component 950, a filtering component 955, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The metadata component 925 may be configured as or otherwise support a means for obtaining, at a DMS, metadata associated with a snapshot stored by the DMS, where the metadata includes information associated with one or more data paths in the snapshot. The index registry component 930 may be configured as or otherwise support a means for scanning, by the DMS and based on obtaining the metadata, an index registry at the DMS for IDs of the one or more data paths in the snapshot, where whether the IDs of the one or more data paths are present within the index registry indicates whether the index registry includes namespace index information that maps a set of multiple data paths in the snapshot to a corresponding set of multiple unique path IDs and hierarchical index information that maps the set of multiple data paths in the snapshot to one or more descendants of the set of multiple data paths in a path hierarchy associated with the snapshot. The index generation component 935 may be configured as or otherwise support a means for generating, by the DMS and based on the metadata, term index information and count index information, where the term index information maps one or more terms to corresponding data paths of the set of multiple data paths in the snapshot that include the one or more terms, and where the count index information maps the set of multiple data paths in the snapshot to corresponding numerical fields. In some examples, the index registry component 930 may be configured as or otherwise support a means for storing, in the index registry at the DMS, the term index information, the count index information, and a group ID that indicates the term index information and the count index information are associated with a same index information group, where the namespace index information and the hierarchical index information are common to a set of multiple index information groups associated with the DMS.

In some examples, the index generation component 935 may be configured as or otherwise support a means for generating the namespace index information and the hierarchical index information for the snapshot. In some examples, the index registry component 930 may be configured as or otherwise support a means for storing, based on generating the namespace index information and the hierarchical index information, the namespace index information and the hierarchical index information in the index registry in association with the IDs of the one or more data paths in the snapshot.

In some examples, to support generating the hierarchical index information, the index generation component 935 may be configured as or otherwise support a means for generating, for a data path from among the set of multiple data paths in the snapshot, a respective key-value entry, where a key of the respective key-value entry includes an ID of the data path and further includes a depth value that indicates a depth of the data path in the path hierarchy associated with the snapshot, and where a value of the respective key-value entry includes a range of child IDs associated with other data paths that are descendants of the data path in the path hierarchy associated with the snapshot.

In some examples, to support generating the namespace index information, the index generation component 935 may be configured as or otherwise support a means for generating, for a data path from among the set of multiple data paths in the snapshot, a respective key-value entry, where a key of the respective key-value entry includes an ID of the data path and a value of the respective key-value entry includes a data structure that indicates data included in the data path.

In some examples, to support generating the namespace index information and the hierarchical index information, the index generation component 935 may be configured as or otherwise support a means for generating the namespace index information and the hierarchical index information based on the scanning indicating that the namespace index information and the hierarchical index information are not present in the index registry.

In some examples, to support generating the namespace index information and the hierarchical index information, the index generation component 935 may be configured as or otherwise support a means for generating the namespace index information and the hierarchical index information for the snapshot before scanning the index registry.

In some examples, to support generating the term index information, the index generation component 935 may be configured as or otherwise support a means for generating, for a term from among the one or more terms included in the snapshot and based on the metadata, a respective bitmap that indicates a set of one or more data paths including data associated with the term.

In some examples, to support generating the count index information, the index generation component 935 may be configured as or otherwise support a means for generating, for an index information group from among the set of multiple index information groups associated with the snapshot, a respective bit slice including a set of multiple bitmaps, where the respective bit slice indicates a set of multiple numerical values associated with the set of multiple data paths in the snapshot, and where a quantity of bitmaps included in the respective bit slice is equal to a quantity of bits in the set of multiple numerical values.

In some examples, to support generating the term index information and the count index information, the accessor component 940 may be configured as or otherwise support a means for converting, using an interface supported by the DMS, the metadata from a first data format supported by an application associated with the metadata to a second data format supported by the DMS, where the term index information and the count index information are stored in accordance with the second data format, and where the group ID associated with the term index information and the count index information corresponds to the interface used to convert the metadata.

In some examples, the query component 945 may be configured as or otherwise support a means for receiving, at the DMS, a request to view a set of data stored at the DMS, the request including one or more parameters for identifying the set of data from among a set of multiple sets of data stored at the DMS. In some examples, the query component 945 may be configured as or otherwise support a means for filtering index information stored in the index registry, where the index information includes the namespace index information, the hierarchical index information, the term index information, and the count index information, and where the index information is filtered based on one or more target data paths, one or more target terms, one or more counts, a target data range, or any combination thereof corresponding to the one or more parameters indicated via the request. In some examples, the query component 945 may be configured as or otherwise support a means for retrieving, based on the filtered index information, the requested set of data from a memory of the DMS. In some examples, the query component 945 may be configured as or otherwise support a means for outputting, via a user interface, the set of data in response to the request.

In some examples, to support filtering the index information, the filtering component 955 may be configured as or otherwise support a means for filtering the index information based on the path hierarchy, where the one or more parameters indicate a directory, and where filtering the index information includes retrieving a subset of index information that is associated with the directory and with a subset of data paths that are descendants of the directory in the path hierarchy.

In some examples, to support filtering the index information, the filtering component 955 may be configured as or otherwise support a means for identifying, from among the term index information in the index registry, one or more term bitmaps that are indexed according to the one or more target terms, where the one or more term bitmaps indicate a set of one or more data paths that include data associated with the one or more target terms. In some examples, to support filtering the index information, the filtering component 955 may be configured as or otherwise support a means for aggregating, based on the count index information in the index registry, the one or more counts, where the count index information includes a set of multiple bit slices associated with the set of multiple index information groups, where a bit slice indicates a set of multiple numerical values associated with the set of multiple data paths in the snapshot, and where aggregating the one or more counts is based on the set of multiple bit slices. In some examples, to support filtering the index information, the filtering component 955 may be configured as or otherwise support a means for identifying, based on the set of multiple bit slices included in the count index information in the index registry, the target data range. In some examples, to support filtering the index information, the filtering component 955 may be configured as or otherwise support a means for sorting the index information based on the set of multiple bit slices included in the count index information in the index registry. In some examples, to support filtering the index information, the filtering component 955 may be configured as or otherwise support a means for any combination thereof.

In some examples, to support sorting the index information, the filtering component 955 may be configured as or otherwise support a means for identifying a quantity of entries in the index information, the quantity of entries in the index information including data associated with one or more first values, where remaining entries in the index information include data associated with one or more second values that are less than the one or more first values, and where the one or more first values, the one or more second values, or both include signed integer values.

In some examples, the metadata component 925 may be configured as or otherwise support a means for obtaining, at the DMS, second metadata associated with the snapshot stored by the DMS, where the second metadata includes second information associated with the one or more data paths in the snapshot. In some examples, the index generation component 935 may be configured as or otherwise support a means for generating, by the DMS and based on the second metadata, second term index information and second count index information, where the second term index information maps one or more terms to corresponding data paths of the set of multiple data paths in the snapshot that include the one or more terms, and where the second count index information maps the set of multiple data paths in the snapshot to corresponding numerical fields. In some examples, the index registry component 930 may be configured as or otherwise support a means for storing, in the index registry at the DMS, the second term index information, the second count index information, and a second group ID that indicates the second term index information and the second count index information are associated with a same index information group, where the namespace index information and the hierarchical index information are common to the set of multiple index information groups associated with the DMS.

In some examples, the metadata is obtained from a first application that executes on the DMS, the first application associated with the group ID. In some examples, the second metadata is obtained from a second application that executes on the DMS, the second application associated with the second group ID.

In some examples, the index descriptor component 950 may be configured as or otherwise support a means for storing, in the index registry, an index descriptor associated with the snapshot, where the index descriptor points to the namespace index information for the snapshot, the hierarchical index information for the snapshot, and one or more source file paths associated with source files in the snapshot that were used to construct index information for one or more index information groups associated with the snapshot, and where the index descriptor further points to the one or more index information groups associated with the snapshot, where an index information group of the one or more index information groups is associated with the group ID, the term index information, and the count index information.

In some examples, the index information group and the corresponding group ID are associated with a first time. In some examples, the metadata is based on an analysis performed at the first time by an application that executes on the DMS, the metadata indicating one or more sensitive data types, suspicious data, or any combination thereof that the analysis associates with the one or more data paths in the snapshot.

In some examples, the one or more terms include a file name, a data path ID, an extension, an operation type, an analyzer, or any combination thereof. In some examples, the corresponding numerical fields include a data path size, a quantity of analyzer hits, a sum, a range, or any combination thereof.

Figure 10:
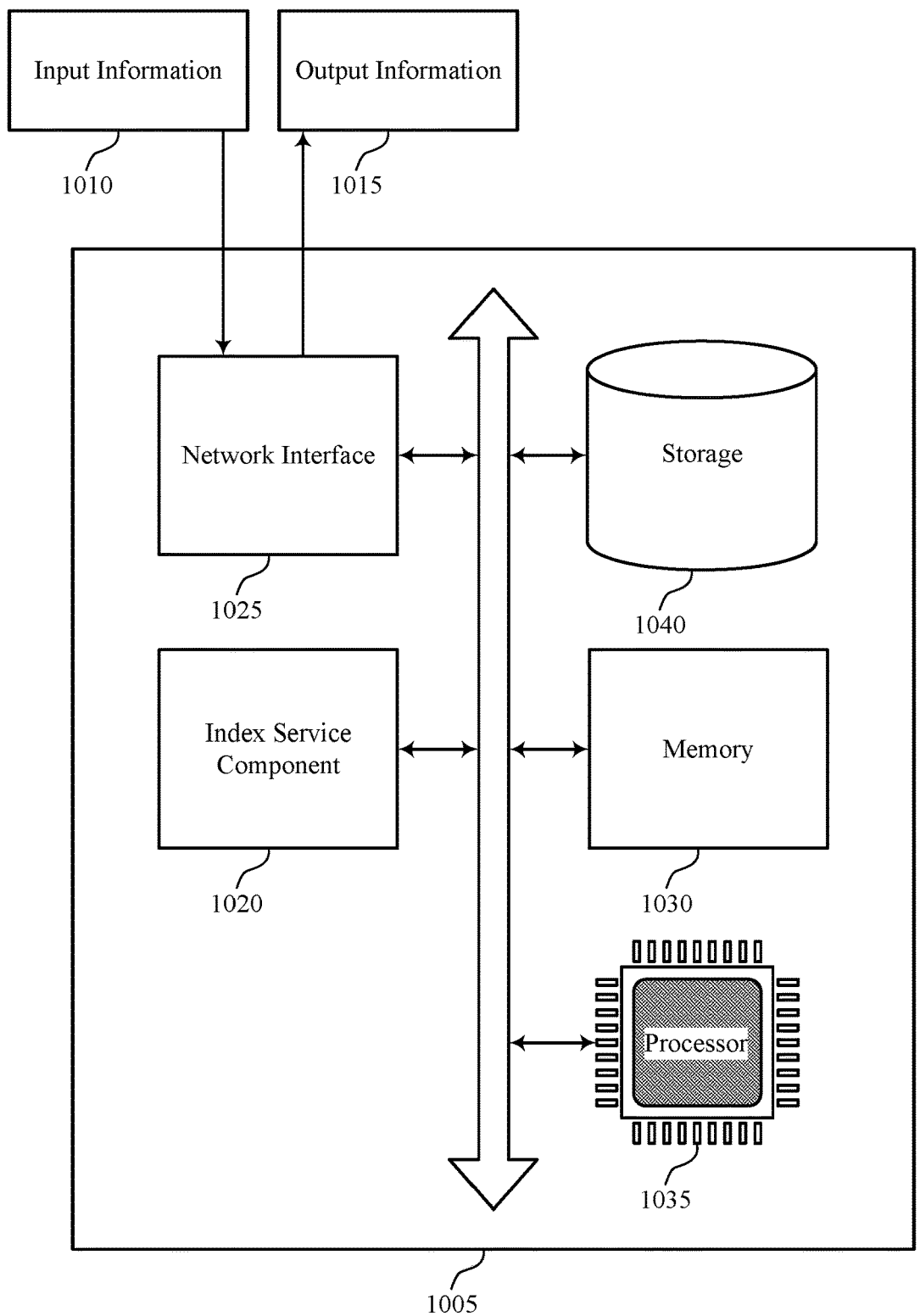
FIG. 10 shows a diagram of a system including a device that supports metadata search, filtering, and aggregation using indexes in accordance with aspects of the present disclosure.

FIG. 10 shows a block diagram 1000 of a system 1005 that supports metadata search, filtering, and aggregation using indexes in accordance with aspects of the present disclosure. The system 1005 may be an example of or include components of a system 705, a system 805, or a DMS as described herein. The system 1005 may include components for data management, including components such as an index service component 1020, an input information 1010, an output information 1015, a network interface 1025, at least one memory 1030, at least one processor 1035, and a storage 1040. These components may be in electronic communication or otherwise coupled with each other (e.g., operatively, communicatively, functionally, electronically, electrically; via one or more buses, communications links, communications interfaces, or any combination thereof). Additionally, the components of the system 1005 may include corresponding physical components or may be implemented as corresponding virtual components (e.g., components of one or more virtual machines). In some examples, the system 1005 may be an example of aspects of one or more components described with reference to FIG. 1, such as a DMS 110.

The network interface 1025 may enable the system 1005 to exchange information (e.g., input information 1010, output information 1015, or both) with other systems or devices (not shown). For example, the network interface 1025 may enable the system 1005 to connect to a network (e.g., a network 120 as described herein). The network interface 1025 may include one or more wireless network interfaces, one or more wired network interfaces, or any combination thereof. In some examples, the network interface 1025 may be an example of may be an example of aspects of one or more components described with reference to FIG. 1, such as one or more network interfaces 165.

Memory 1030 may include RAM, ROM, or both. The memory 1030 may store computer-readable, computer-executable software including instructions that, when executed, cause the processor 1035 to perform various functions described herein. In some cases, the memory 1030 may contain, among other things, a basic input/output system (BIOS), which may control basic hardware or software operation such as the interaction with peripheral components or devices. In some cases, the memory 1030 may be an example of aspects of one or more components described with reference to FIG. 1, such as one or more memories 175.

The processor 1035 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 1035 may be configured to execute computer-readable instructions stored in a memory 1030 to perform various functions (e.g., functions or tasks supporting metadata search, filtering, and aggregation using indexes). Though a single processor 1035 is depicted in the example of FIG. 10, it is to be understood that the system 1005 may include any quantity of one or more of processors 1035 and that a group of processors 1035 may collectively perform one or more functions ascribed herein to a processor, such as the processor 1035. In some cases, the processor 1035 may be an example of aspects of one or more components described with reference to FIG. 1, such as one or more processors 170.

Storage 1040 may be configured to store data that is generated, processed, stored, or otherwise used by the system 1005. In some cases, the storage 1040 may include one or more HDDs, one or more SDDs, or both. In some examples, the storage 1040 may be an example of a single database, a distributed database, multiple distributed databases, a data store, a data lake, or an emergency backup database. In some examples, the storage 1040 may be an example of one or more components described with reference to FIG. 1, such as one or more network disks 180.

For example, the index service component 1020 may be configured as or otherwise support a means for obtaining, at a DMS, metadata associated with a snapshot stored by the DMS, where the metadata includes information associated with one or more data paths in the snapshot. The index service component 1020 may be configured as or otherwise support a means for scanning, by the DMS and based on obtaining the metadata, an index registry at the DMS for IDs of the one or more data paths in the snapshot, where whether the IDs of the one or more data paths are present within the index registry indicates whether the index registry includes namespace index information that maps a set of multiple data paths in the snapshot to a corresponding set of multiple unique path IDs and hierarchical index information that maps the set of multiple data paths in the snapshot to one or more descendants of the set of multiple data paths in a path hierarchy associated with the snapshot. The index service component 1020 may be configured as or otherwise support a means for generating, by the DMS and based on the metadata, term index information and count index information, where the term index information maps one or more terms to corresponding data paths of the set of multiple data paths in the snapshot that include the one or more terms, and where the count index information maps the set of multiple data paths in the snapshot to corresponding numerical fields. The index service component 1020 may be configured as or otherwise support a means for storing, in the index registry at the DMS, the term index information, the count index information, and a group ID that indicates the term index information and the count index information are associated with a same index information group, where the namespace index information and the hierarchical index information are common to a set of multiple index information groups associated with the DMS.

By including or configuring the index service component 1020 in accordance with examples as described herein, the system 1005 may support techniques for metadata search, filtering, and aggregation using indexes, which may provide one or more benefits such as, for example, improved reliability, reduced latency, and improved user experience when servicing query request, by, for example, supporting a relatively wide variety of different query algorithms relatively efficiently using different indexing techniques, including indexing by hierarchy, and index formats including bitmaps and bit slices. The system 1005 may additionally, or alternatively, support reduced power consumption, more efficient utilization of computing resources, network resources or both, among other possibilities.

Figure 11:
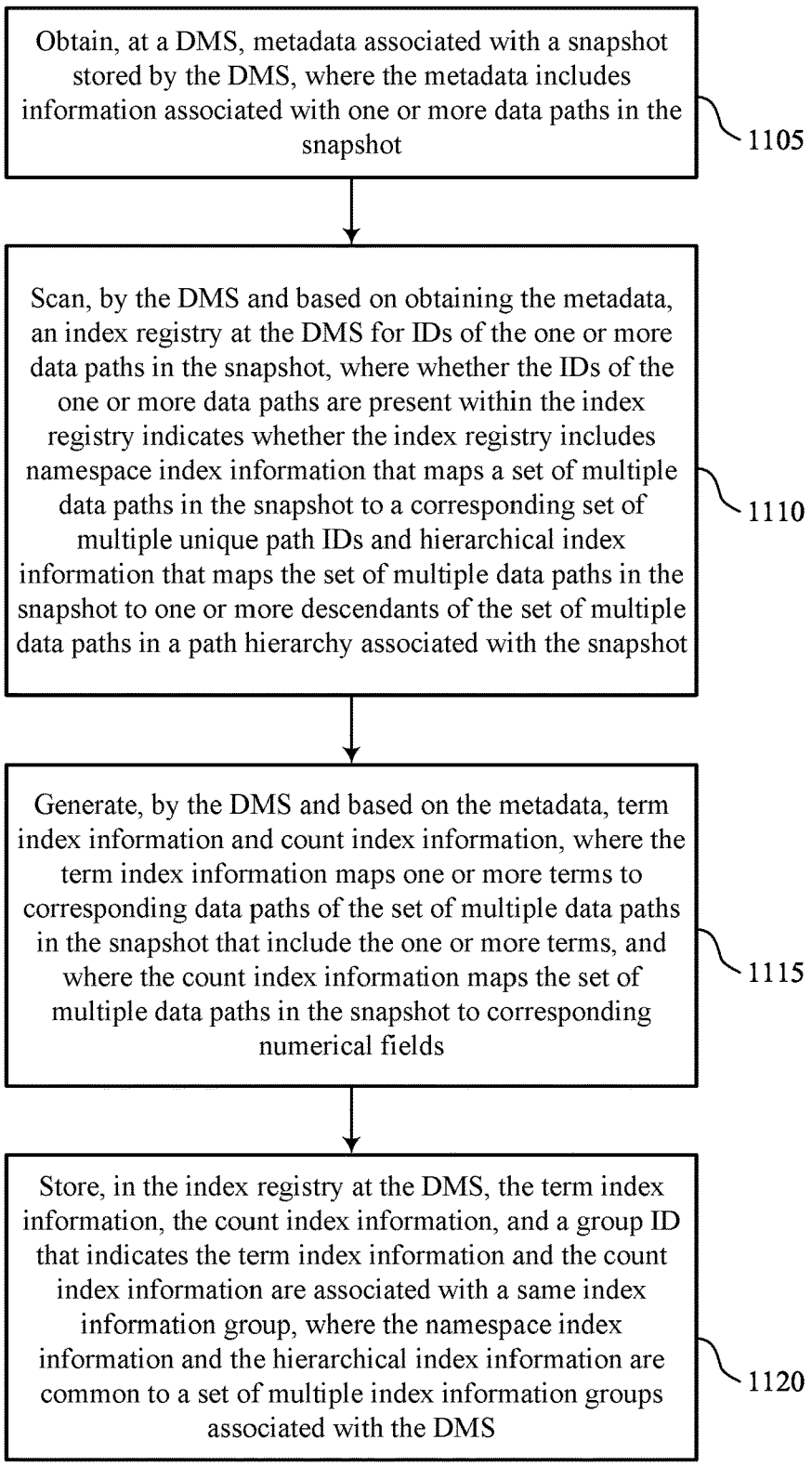
FIGS. 11 through 13 show flowcharts illustrating methods that support metadata search, filtering, and aggregation using indexes in accordance with aspects of the present disclosure.

FIG. 11 shows a flowchart illustrating a method 1100 that supports metadata search, filtering, and aggregation using indexes in accordance with aspects of the present disclosure. The operations of the method 1100 may be implemented by a DMS or its components as described herein. For example, the operations of the method 1100 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1105, the method may include obtaining, at a DMS, metadata associated with a snapshot stored by the DMS, where the metadata includes information associated with one or more data paths in the snapshot. The operations of 1105 may be performed in accordance with examples as disclosed herein. In some examples, aspects of the operations of 1105 may be performed by a metadata component 925 as described with reference to FIG. 9.

At 1110, the method may include scanning, by the DMS and based on obtaining the metadata, an index registry at the DMS for IDs of the one or more data paths in the snapshot, where whether the IDs of the one or more data paths are present within the index registry indicates whether the index registry includes namespace index information that maps a set of multiple data paths in the snapshot to a corresponding set of multiple unique path IDs and hierarchical index information that maps the set of multiple data paths in the snapshot to one or more descendants of the set of multiple data paths in a path hierarchy associated with the snapshot. The operations of 1110 may be performed in accordance with examples as disclosed herein. In some examples, aspects of the operations of 1110 may be performed by an index registry component 930 as described with reference to FIG. 9.

At 1115, the method may include generating, by the DMS and based on the metadata, term index information and count index information, where the term index information maps one or more terms to corresponding data paths of the set of multiple data paths in the snapshot that include the one or more terms, and where the count index information maps the set of multiple data paths in the snapshot to corresponding numerical fields. The operations of 1115 may be performed in accordance with examples as disclosed herein. In some examples, aspects of the operations of 1115 may be performed by an index generation component 935 as described with reference to FIG. 9.

At 1120, the method may include storing, in the index registry at the DMS, the term index information, the count index information, and a group ID that indicates the term index information and the count index information are associated with a same index information group, where the namespace index information and the hierarchical index information are common to a set of multiple index information groups associated with the DMS. The operations of 1120 may be performed in accordance with examples as disclosed herein. In some examples, aspects of the operations of 1120 may be performed by an index registry component 930 as described with reference to FIG. 9.

Figure 12:
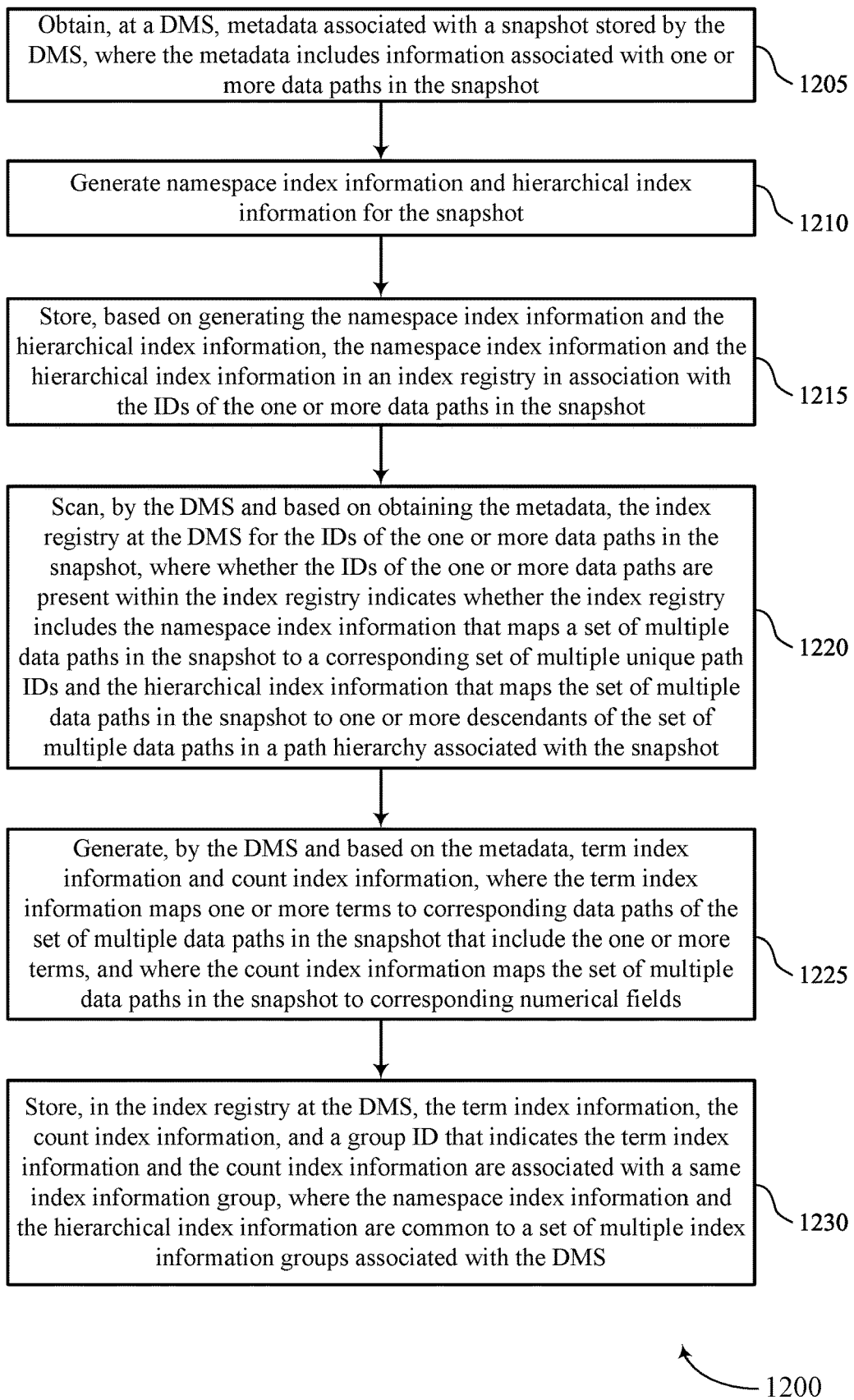

FIG. 12 shows a flowchart illustrating a method 1200 that supports metadata search, filtering, and aggregation using indexes in accordance with aspects of the present disclosure. The operations of the method 1200 may be implemented by a DMS or its components as described herein. For example, the operations of the method 1200 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1205, the method may include obtaining, at a DMS, metadata associated with a snapshot stored by the DMS, where the metadata includes information associated with one or more data paths in the snapshot. The operations of 1205 may be performed in accordance with examples as disclosed herein. In some examples, aspects of the operations of 1205 may be performed by a metadata component 925 as described with reference to FIG. 9.

At 1210, the method may include generating namespace index information and hierarchical index information for the snapshot. The operations of 1210 may be performed in accordance with examples as disclosed herein. In some examples, aspects of the operations of 1210 may be performed by an index generation component 935 as described with reference to FIG. 9.

At 1215, the method may include storing, based on generating the namespace index information and the hierarchical index information, the namespace index information and the hierarchical index information in an index registry in association with IDs of the one or more data paths in the snapshot. The operations of 1215 may be performed in accordance with examples as disclosed herein. In some examples, aspects of the operations of 1215 may be performed by an index registry component 930 as described with reference to FIG. 9.

At 1220, the method may include scanning, by the DMS and based on obtaining the metadata, the index registry at the DMS for the IDs of the one or more data paths in the snapshot, where whether the IDs of the one or more data paths are present within the index registry indicates whether the index registry includes the namespace index information that maps a set of multiple data paths in the snapshot to a corresponding set of multiple unique path IDs and the hierarchical index information that maps the set of multiple data paths in the snapshot to one or more descendants of the set of multiple data paths in a path hierarchy associated with the snapshot. The operations of 1220 may be performed in accordance with examples as disclosed herein. In some examples, aspects of the operations of 1220 may be performed by an index registry component 930 as described with reference to FIG. 9.

At 1225, the method may include generating, by the DMS and based on the metadata, term index information and count index information, where the term index information maps one or more terms to corresponding data paths of the set of multiple data paths in the snapshot that include the one or more terms, and where the count index information maps the set of multiple data paths in the snapshot to corresponding numerical fields. The operations of 1225 may be performed in accordance with examples as disclosed herein. In some examples, aspects of the operations of 1225 may be performed by an index generation component 935 as described with reference to FIG. 9.

At 1230, the method may include storing, in the index registry at the DMS, the term index information, the count index information, and a group ID that indicates the term index information and the count index information are associated with a same index information group, where the namespace index information and the hierarchical index information are common to a set of multiple index information groups associated with the DMS. The operations of 1230 may be performed in accordance with examples as disclosed herein. In some examples, aspects of the operations of 1230 may be performed by an index registry component 930 as described with reference to FIG. 9.

Figure 13:
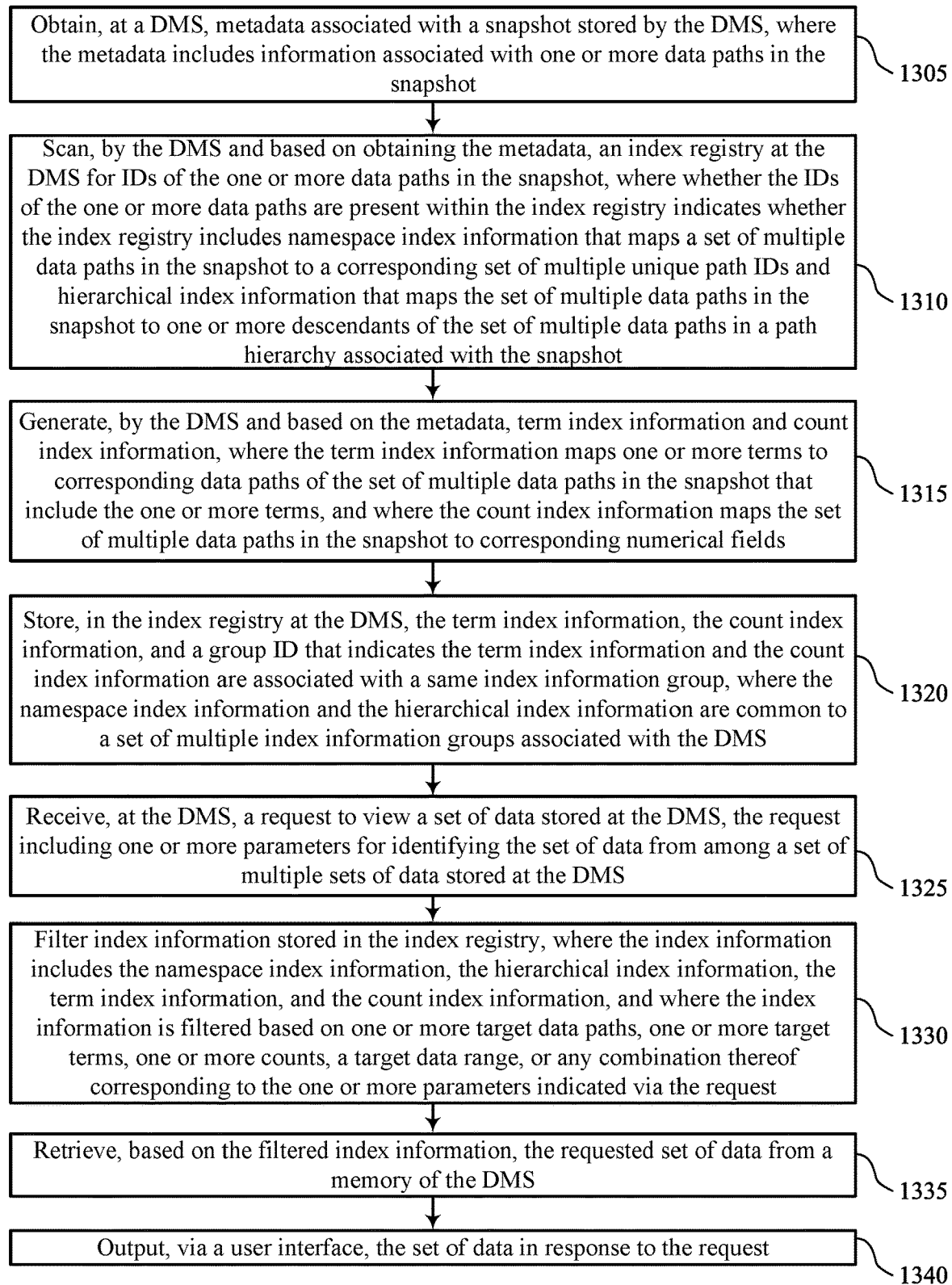

FIG. 13 shows a flowchart illustrating a method 1300 that supports metadata search, filtering, and aggregation using indexes in accordance with aspects of the present disclosure. The operations of the method 1300 may be implemented by a DMS or its components as described herein. For example, the operations of the method 1300 may be performed by a DMS as described with reference to FIGS. 1 through 10. In some examples, a DMS may execute a set of instructions to control the functional elements of the DMS to perform the described functions. Additionally, or alternatively, the DMS may perform aspects of the described functions using special-purpose hardware.

At 1305, the method may include obtaining, at a DMS, metadata associated with a snapshot stored by the DMS, where the metadata includes information associated with one or more data paths in the snapshot. The operations of 1305 may be performed in accordance with examples as disclosed herein. In some examples, aspects of the operations of 1305 may be performed by a metadata component 925 as described with reference to FIG. 9.

At 1310, the method may include scanning, by the DMS and based on obtaining the metadata, an index registry at the DMS for IDs of the one or more data paths in the snapshot, where whether the IDs of the one or more data paths are present within the index registry indicates whether the index registry includes namespace index information that maps a set of multiple data paths in the snapshot to a corresponding set of multiple unique path IDs and hierarchical index information that maps the set of multiple data paths in the snapshot to one or more descendants of the set of multiple data paths in a path hierarchy associated with the snapshot. The operations of 1310 may be performed in accordance with examples as disclosed herein. In some examples, aspects of the operations of 1310 may be performed by an index registry component 930 as described with reference to FIG. 9.

At 1315, the method may include generating, by the DMS and based on the metadata, term index information and count index information, where the term index information maps one or more terms to corresponding data paths of the set of multiple data paths in the snapshot that include the one or more terms, and where the count index information maps the set of multiple data paths in the snapshot to corresponding numerical fields. The operations of 1315 may be performed in accordance with examples as disclosed herein. In some examples, aspects of the operations of 1315 may be performed by an index generation component 935 as described with reference to FIG. 9.

At 1320, the method may include storing, in the index registry at the DMS, the term index information, the count index information, and a group ID that indicates the term index information and the count index information are associated with a same index information group, where the namespace index information and the hierarchical index information are common to a set of multiple index information groups associated with the DMS. The operations of 1320 may be performed in accordance with examples as disclosed herein. In some examples, aspects of the operations of 1320 may be performed by an index registry component 930 as described with reference to FIG. 9.

At 1325, the method may include receiving, at the DMS, a request to view a set of data stored at the DMS, the request including one or more parameters for identifying the set of data from among a set of multiple sets of data stored at the DMS. The operations of 1325 may be performed in accordance with examples as disclosed herein. In some examples, aspects of the operations of 1325 may be performed by a query component 945 as described with reference to FIG. 9.

At 1330, the method may include filtering index information stored in the index registry, where the index information includes the namespace index information, the hierarchical index information, the term index information, and the count index information, and where the index information is filtered based on one or more target data paths, one or more target terms, one or more counts, a target data range, or any combination thereof corresponding to the one or more parameters indicated via the request. The operations of 1330 may be performed in accordance with examples as disclosed herein. In some examples, aspects of the operations of 1330 may be performed by a query component 945 as described with reference to FIG. 9.

At 1335, the method may include retrieving, based on the filtered index information, the requested set of data from a memory of the DMS. The operations of 1335 may be performed in accordance with examples as disclosed herein. In some examples, aspects of the operations of 1335 may be performed by a query component 945 as described with reference to FIG. 9.

At 1340, the method may include outputting, via a user interface, the set of data in response to the request. The operations of 1340 may be performed in accordance with examples as disclosed herein. In some examples, aspects of the operations of 1340 may be performed by a query component 945 as described with reference to FIG. 9.

A method by an apparatus is described. The method may include obtaining, at a DMS, metadata associated with a snapshot stored by the DMS, where the metadata includes information associated with one or more data paths in the snapshot, scanning, by the DMS and based on obtaining the metadata, an index registry at the DMS for IDs of the one or more data paths in the snapshot, where whether the IDs of the one or more data paths are present within the index registry indicates whether the index registry includes namespace index information that maps a set of multiple data paths in the snapshot to a corresponding set of multiple unique path IDs and hierarchical index information that maps the set of multiple data paths in the snapshot to one or more descendants of the set of multiple data paths in a path hierarchy associated with the snapshot, generating, by the DMS and based on the metadata, term index information and count index information, where the term index information maps one or more terms to corresponding data paths of the set of multiple data paths in the snapshot that include the one or more terms, and where the count index information maps the set of multiple data paths in the snapshot to corresponding numerical fields, and storing, in the index registry at the DMS, the term index information, the count index information, and a group ID that indicates the term index information and the count index information are associated with a same index information group, where the namespace index information and the hierarchical index information are common to a set of multiple index information groups associated with the DMS.

An apparatus is described. The apparatus may include one or more memories storing processor executable code, and one or more processors coupled with the one or more memories. The one or more processors may individually or collectively be operable to execute the code to cause the apparatus to obtain, at a DMS, metadata associated with a snapshot stored by the DMS, where the metadata includes information associated with one or more data paths in the snapshot, scan, by the DMS and based on obtaining the metadata, an index registry at the DMS for IDs of the one or more data paths in the snapshot, where whether the IDs of the one or more data paths are present within the index registry indicates whether the index registry includes namespace index information that maps a set of multiple data paths in the snapshot to a corresponding set of multiple unique path IDs and hierarchical index information that maps the set of multiple data paths in the snapshot to one or more descendants of the set of multiple data paths in a path hierarchy associated with the snapshot, generate, by the DMS and based on the metadata, term index information and count index information, where the term index information maps one or more terms to corresponding data paths of the set of multiple data paths in the snapshot that include the one or more terms, and where the count index information maps the set of multiple data paths in the snapshot to corresponding numerical fields, and store, in the index registry at the DMS, the term index information, the count index information, and a group ID that indicates the term index information and the count index information are associated with a same index information group, where the namespace index information and the hierarchical index information are common to a set of multiple index information groups associated with the DMS.

Another apparatus is described. The apparatus may include means for obtaining, at a DMS, metadata associated with a snapshot stored by the DMS, where the metadata includes information associated with one or more data paths in the snapshot, means for scanning, by the DMS and based on obtaining the metadata, an index registry at the DMS for IDs of the one or more data paths in the snapshot, where whether the IDs of the one or more data paths are present within the index registry indicates whether the index registry includes namespace index information that maps a set of multiple data paths in the snapshot to a corresponding set of multiple unique path IDs and hierarchical index information that maps the set of multiple data paths in the snapshot to one or more descendants of the set of multiple data paths in a path hierarchy associated with the snapshot, means for generating, by the DMS and based on the metadata, term index information and count index information, where the term index information maps one or more terms to corresponding data paths of the set of multiple data paths in the snapshot that include the one or more terms, and where the count index information maps the set of multiple data paths in the snapshot to corresponding numerical fields, and means for storing, in the index registry at the DMS, the term index information, the count index information, and a group ID that indicates the term index information and the count index information are associated with a same index information group, where the namespace index information and the hierarchical index information are common to a set of multiple index information groups associated with the DMS.

A non-transitory computer-readable medium storing code is described. The code may include instructions executable by one or more processors to obtain, at a DMS, metadata associated with a snapshot stored by the DMS, where the metadata includes information associated with one or more data paths in the snapshot, scan, by the DMS and based on obtaining the metadata, an index registry at the DMS for IDs of the one or more data paths in the snapshot, where whether the IDs of the one or more data paths are present within the index registry indicates whether the index registry includes namespace index information that maps a set of multiple data paths in the snapshot to a corresponding set of multiple unique path IDs and hierarchical index information that maps the set of multiple data paths in the snapshot to one or more descendants of the set of multiple data paths in a path hierarchy associated with the snapshot, generate, by the DMS and based on the metadata, term index information and count index information, where the term index information maps one or more terms to corresponding data paths of the set of multiple data paths in the snapshot that include the one or more terms, and where the count index information maps the set of multiple data paths in the snapshot to corresponding numerical fields, and store, in the index registry at the DMS, the term index information, the count index information, and a group ID that indicates the term index information and the count index information are associated with a same index information group, where the namespace index information and the hierarchical index information are common to a set of multiple index information groups associated with the DMS.

Some examples of the method, apparatus, and non-transitory computer-readable medium described herein may further include operations, features, means, or instructions for generating the namespace index information and the hierarchical index information for the snapshot and storing, based on generating the namespace index information and the hierarchical index information, the namespace index information and the hierarchical index information in the index registry in association with the IDs of the one or more data paths in the snapshot.

In some examples of the method, apparatus, and non-transitory computer-readable medium described herein, operations, features, means, or instructions for generating the hierarchical index information may include operations, features, means, or instructions for generating, for a data path from among the set of multiple data paths in the snapshot, a respective key-value entry, where a key of the respective key-value entry includes an ID of the data path and further includes a depth value that indicates a depth of the data path in the path hierarchy associated with the snapshot, and where a value of the respective key-value entry includes a range of child IDs associated with other data paths that may be descendants of the data path in the path hierarchy associated with the snapshot.

In some examples of the method, apparatus, and non-transitory computer-readable medium described herein, operations, features, means, or instructions for generating the namespace index information may include operations, features, means, or instructions for generating, for a data path from among the set of multiple data paths in the snapshot, a respective key-value entry, where a key of the respective key-value entry includes an ID of the data path and a value of the respective key-value entry includes a data structure that indicates data included in the data path.

In some examples of the method, apparatus, and non-transitory computer-readable medium described herein, operations, features, means, or instructions for generating the namespace index information and the hierarchical index information may include operations, features, means, or instructions for generating the namespace index information and the hierarchical index information based on the scanning indicating that the namespace index information and the hierarchical index information may be not present in the index registry.

In some examples of the method, apparatus, and non-transitory computer-readable medium described herein, operations, features, means, or instructions for generating the namespace index information and the hierarchical index information may include operations, features, means, or instructions for generating the namespace index information and the hierarchical index information for the snapshot before scanning the index registry.

In some examples of the method, apparatus, and non-transitory computer-readable medium described herein, operations, features, means, or instructions for generating the term index information may include operations, features, means, or instructions for generating, for a term from among the one or more terms included in the snapshot and based on the metadata, a respective bitmap that indicates a set of one or more data paths including data associated with the term.

In some examples of the method, apparatus, and non-transitory computer-readable medium described herein, operations, features, means, or instructions for generating the count index information may include operations, features, means, or instructions for generating, for an index information group from among the set of multiple index information groups associated with the snapshot, a respective bit slice including a set of multiple bitmaps, where the respective bit slice indicates a set of multiple numerical values associated with the set of multiple data paths in the snapshot, and where a quantity of bitmaps included in the respective bit slice may be equal to a quantity of bits in the set of multiple numerical values.

In some examples of the method, apparatus, and non-transitory computer-readable medium described herein, operations, features, means, or instructions for generating the term index information and the count index information may include operations, features, means, or instructions for converting, using an interface supported by the DMS, the metadata from a first data format supported by an application associated with the metadata to a second data format supported by the DMS, where the term index information and the count index information may be stored in accordance with the second data format, and where the group ID associated with the term index information and the count index information corresponds to the interface used to convert the metadata.

Some examples of the method, apparatus, and non-transitory computer-readable medium described herein may further include operations, features, means, or instructions for receiving, at the DMS, a request to view a set of data stored at the DMS, the request including one or more parameters for identifying the set of data from among a set of multiple sets of data stored at the DMS, filtering index information stored in the index registry, where the index information includes the namespace index information, the hierarchical index information, the term index information, and the count index information, and where the index information may be filtered based on one or more target data paths, one or more target terms, one or more counts, a target data range, or any combination thereof corresponding to the one or more parameters indicated via the request, retrieving, based on the filtered index information, the requested set of data from a memory of the DMS, and outputting, via a user interface, the set of data in response to the request.

In some examples of the method, apparatus, and non-transitory computer-readable medium described herein, operations, features, means, or instructions for filtering the index information may include operations, features, means, or instructions for filtering the index information based on the path hierarchy, where the one or more parameters indicate a directory, and where filtering the index information includes retrieving a subset of index information that may be associated with the directory and with a subset of data paths that may be descendants of the directory in the path hierarchy.

In some examples of the method, apparatus, and non-transitory computer-readable medium described herein, operations, features, means, or instructions for filtering the index information may include operations, features, means, or instructions for identifying, from among the term index information in the index registry, one or more term bitmaps that may be indexed according to the one or more target terms, where the one or more term bitmaps indicate a set of one or more data paths that include data associated with the one or more target terms, aggregating, based on the count index information in the index registry, the one or more counts, where the count index information includes a set of multiple bit slices associated with the set of multiple index information groups, where a bit slice indicates a set of multiple numerical values associated with the set of multiple data paths in the snapshot, and where aggregating the one or more counts may be based on the set of multiple bit slices, identifying, based on the set of multiple bit slices included in the count index information in the index registry, the target data range, sorting the index information based on the set of multiple bit slices included in the count index information in the index registry, and any combination thereof.

In some examples of the method, apparatus, and non-transitory computer-readable medium described herein, operations, features, means, or instructions for sorting the index information may include operations, features, means, or instructions for identifying a quantity of entries in the index information, the quantity of entries in the index information including data associated with one or more first values, where remaining entries in the index information include data associated with one or more second values that may be less than the one or more first values, and where the one or more first values, the one or more second values, or both include signed integer values.

Some examples of the method, apparatus, and non-transitory computer-readable medium described herein may further include operations, features, means, or instructions for obtaining, at the data management system, second metadata associated with the snapshot stored by the data management system, where the second metadata includes second information associated with the one or more data paths in the snapshot, generating, by the data management system and based on the second metadata, second term index information and second count index information, where the second term index information maps one or more terms to corresponding data paths of the set of multiple data paths in the snapshot that include the one or more terms, and where the second count index information maps the set of multiple data paths in the snapshot to corresponding numerical fields, and storing, in the index registry at the data management system, the second term index information, the second count index information, and a second group identifier that indicates the second term index information and the second count index information may be associated with a same index information group, where the namespace index information and the hierarchical index information may be common to the set of multiple index information groups associated with the data management system.

In some examples of the method, apparatus, and non-transitory computer-readable medium described herein, the metadata may be obtained from a first application that executes on the data management system, the first application associated with the group identifier and the second metadata may be obtained from a second application that executes on the data management system, the second application associated with the second group identifier.

Some examples of the method, apparatus, and non-transitory computer-readable medium described herein may further include operations, features, means, or instructions for storing, in the index registry, an index descriptor associated with the snapshot, where the index descriptor points to the namespace index information for the snapshot, the hierarchical index information for the snapshot, and one or more source file paths associated with source files in the snapshot that were used to construct index information for one or more index information groups associated with the snapshot, and where the index descriptor further points to the one or more index information groups associated with the snapshot, where an index information group of the one or more index information groups may be associated with the group identifier, the term index information, and the count index information.

In some examples of the method, apparatus, and non-transitory computer-readable medium described herein, the index information group and the corresponding group identifier may be associated with a first time and the metadata may be based on an analysis performed at the first time by an application that executes on the data management system, the metadata indicating one or more sensitive data types, suspicious data, or any combination thereof that the analysis associates with the one or more data paths in the snapshot.

In some examples of the method, apparatus, and non-transitory computer-readable medium described herein, the one or more terms include a file name, a data path identifier, an extension, an operation type, an analyzer, or any combination thereof and the corresponding numerical fields include a data path size, a quantity of analyzer hits, a sum, a range, or any combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
    obtaining, at a data management system, metadata associated with a snapshot stored by the data management system, wherein the metadata comprises information associated with one or more data paths in the snapshot;
    scanning, by the data management system and based at least in part on obtaining the metadata, an index registry at the data management system for identifiers of the one or more data paths in the snapshot, wherein whether the identifiers of the one or more data paths are present within the index registry indicates whether the index registry comprises namespace index information that maps a plurality of data paths in the snapshot to a corresponding plurality of unique path identifiers and hierarchical index information that maps the plurality of data paths in the snapshot to one or more descendants of the plurality of data paths in a path hierarchy associated with the snapshot;
    generating, by the data management system and based at least in part on the metadata, term index information and count index information, wherein the term index information maps one or more terms to corresponding data paths of the plurality of data paths in the snapshot that include the one or more terms, and wherein the count index information maps the plurality of data paths in the snapshot to corresponding numerical fields; and
    storing, in the index registry at the data management system, the term index information, the count index information, and a group identifier that indicates the term index information and the count index information are associated with a same index information group, wherein the namespace index information and the hierarchical index information are common to a plurality of index information groups associated with the data management system.

2. The method of claim 1, further comprising:
    generating the namespace index information and the hierarchical index information for the snapshot; and
    storing, based at least in part on generating the namespace index information and the hierarchical index information, the namespace index information and the hierarchical index information in the index registry in association with the identifiers of the one or more data paths in the snapshot.

3. The method of claim 2, wherein generating the hierarchical index information comprises:
    generating, for a data path from among the plurality of data paths in the snapshot, a respective key-value entry, wherein a key of the respective key-value entry comprises an identifier of the data path and further comprises a depth value that indicates a depth of the data path in the path hierarchy associated with the snapshot, and wherein a value of the respective key-value entry comprises a range of child identifiers associated with other data paths that are descendants of the data path in the path hierarchy associated with the snapshot.

4. The method of claim 2, wherein generating the namespace index information comprises:
    generating, for a data path from among the plurality of data paths in the snapshot, a respective key-value entry, wherein a key of the respective key-value entry comprises an identifier of the data path and a value of the respective key-value entry comprises a data structure that indicates data included in the data path.

5. The method of claim 2, wherein generating the namespace index information and the hierarchical index information comprises:
    generating the namespace index information and the hierarchical index information based at least in part on the scanning indicating that the namespace index information and the hierarchical index information are not present in the index registry.

6. The method of claim 2, wherein generating the namespace index information and the hierarchical index information comprises:
    generating the namespace index information and the hierarchical index information for the snapshot before scanning the index registry.

7. The method of claim 1, wherein generating the term index information comprises:
    generating, for a term from among the one or more terms included in the snapshot and based at least in part on the metadata, a respective bitmap that indicates a set of one or more data paths comprising data associated with the term.

8. The method of claim 1, wherein generating the count index information comprises:
    generating, for an index information group from among the plurality of index information groups associated with the snapshot, a respective bit slice comprising a plurality of bitmaps, wherein the respective bit slice indicates a plurality of numerical values associated with the plurality of data paths in the snapshot, and wherein a quantity of bitmaps included in the respective bit slice is equal to a quantity of bits in the plurality of numerical values.

9. The method of claim 1, wherein generating the term index information and the count index information comprises:
    converting, using an interface supported by the data management system, the metadata from a first data format supported by an application associated with the metadata to a second data format supported by the data management system, wherein the term index information and the count index information are stored in accordance with the second data format, and wherein the group identifier associated with the term index information and the count index information corresponds to the interface used to convert the metadata.

10. The method of claim 1, further comprising:
receiving, at the data management system, a request to view a set of data stored at the data management system, the request comprising one or more parameters for identifying the set of data from among a plurality of sets of data stored at the data management system;
filtering index information stored in the index registry, wherein the index information comprises the namespace index information, the hierarchical index information, the term index information, and the count index information, and wherein the index information is filtered based at least in part on one or more target data paths, one or more target terms, one or more counts, a target data range, or any combination thereof corresponding to the one or more parameters indicated via the request;
retrieving, based at least in part on the filtered index information, the requested set of data from a memory of the data management system; and
outputting, via a user interface, the set of data in response to the request.

11. The method of claim 10, wherein filtering the index information comprises:
filtering the index information based at least in part on the path hierarchy, wherein the one or more parameters indicate a directory, and wherein filtering the index information comprises retrieving a subset of index information that is associated with the directory and with a subset of data paths that are descendants of the directory in the path hierarchy.

12. The method of claim 10, wherein filtering the index information comprises:
identifying, from among the term index information in the index registry, one or more term bitmaps that are indexed according to the one or more target terms, wherein the one or more term bitmaps indicate a set of one or more data paths that include data associated with the one or more target terms; or
aggregating, based at least in part on the count index information in the index registry, the one or more counts, wherein the count index information comprises a plurality of bit slices associated with the plurality of index information groups, wherein a bit slice indicates a plurality of numerical values associated with the plurality of data paths in the snapshot, and wherein aggregating the one or more counts is based at least in part on the plurality of bit slices; or
identifying, based at least in part on the plurality of bit slices included in the count index information in the index registry, the target data range; or
sorting the index information based at least in part on the plurality of bit slices included in the count index information in the index registry; or
any combination thereof.

13. The method of claim 12, wherein sorting the index information comprises:
identifying a quantity of entries in the index information, the quantity of entries in the index information comprising data associated with one or more first values, wherein remaining entries in the index information comprise data associated with one or more second values that are less than the one or more first values, and wherein the one or more first values, the one or more second values, or both comprise signed integer values.

14. The method of claim 1, further comprising:
obtaining, at the data management system, second metadata associated with the snapshot stored by the data management system, wherein the second metadata comprises second information associated with the one or more data paths in the snapshot;
generating, by the data management system and based at least in part on the second metadata, second term index information and second count index information, wherein the second term index information maps one or more terms to corresponding data paths of the plurality of data paths in the snapshot that include the one or more terms, and wherein the second count index information maps the plurality of data paths in the snapshot to corresponding numerical fields; and
storing, in the index registry at the data management system, the second term index information, the second count index information, and a second group identifier that indicates the second term index information and the second count index information are associated with a same index information group, wherein the namespace index information and the hierarchical index information are common to the plurality of index information groups associated with the data management system.

15. The method of claim 14, wherein:
the metadata is obtained from a first application that executes on the data management system, the first application associated with the group identifier; and
the second metadata is obtained from a second application that executes on the data management system, the second application associated with the second group identifier.

16. The method of claim 1, further comprising:
storing, in the index registry, an index descriptor associated with the snapshot, wherein the index descriptor points to the namespace index information for the snapshot, the hierarchical index information for the snapshot, and one or more source file paths associated with source files in the snapshot that were used to construct index information for one or more index information groups associated with the snapshot, and wherein the index descriptor further points to the one or more index information groups associated with the snapshot, wherein an index information group of the one or more index information groups is associated with the group identifier, the term index information, and the count index information.

17. The method of claim 1, wherein:
the index information group and the corresponding group identifier are associated with a first time; and
the metadata is based at least in part on an analysis performed at the first time by an application that executes on the data management system, the metadata indicating one or more sensitive data types, suspicious data, or any combination thereof that the analysis associates with the one or more data paths in the snapshot.

18. The method of claim 1, wherein:
the one or more terms comprise a file name, a data path identifier, an extension, an operation type, an analyzer, or any combination thereof; and
the corresponding numerical fields comprise a data path size, a quantity of analyzer hits, a sum, a range, or any combination thereof.

19. An apparatus, comprising:
one or more memories storing processor-executable code; and
one or more processors coupled with the one or more memories and individually or collectively operable to execute the code to cause the apparatus to:
- obtain, at a data management system, metadata associated with a snapshot stored by the data management system, wherein the metadata comprises information associated with one or more data paths in the snapshot;
- scan, by the data management system and based at least in part on obtaining the metadata, an index registry at the data management system for identifiers of the one or more data paths in the snapshot, wherein whether the identifiers of the one or more data paths are present within the index registry indicates whether the index registry comprises namespace index information that maps a plurality of data paths in the snapshot to a corresponding plurality of unique path identifiers and hierarchical index information that maps the plurality of data paths in the snapshot to one or more descendants of the plurality of data paths in a path hierarchy associated with the snapshot;
- generate, by the data management system and based at least in part on the metadata, term index information and count index information, wherein the term index information maps one or more terms to corresponding data paths of the plurality of data paths in the snapshot that include the one or more terms, and wherein the count index information maps the plurality of data paths in the snapshot to corresponding numerical fields; and
- store, in the index registry at the data management system, the term index information, the count index information, and a group identifier that indicates the term index information and the count index information are associated with a same index information group, wherein the namespace index information and the hierarchical index information are common to a plurality of index information groups associated with the data management system.

20. A non-transitory computer-readable medium storing code, the code comprising instructions executable by one or more processors to:
- obtain, at a data management system, metadata associated with a snapshot stored by the data management system, wherein the metadata comprises information associated with one or more data paths in the snapshot;
- scan, by the data management system and based at least in part on obtaining the metadata, an index registry at the data management system for identifiers of the one or more data paths in the snapshot, wherein whether the identifiers of the one or more data paths are present within the index registry indicates whether the index registry comprises namespace index information that maps a plurality of data paths in the snapshot to a corresponding plurality of unique path identifiers and hierarchical index information that maps the plurality of data paths in the snapshot to one or more descendants of the plurality of data paths in a path hierarchy associated with the snapshot;
- generate, by the data management system and based at least in part on the metadata, term index information and count index information, wherein the term index information maps one or more terms to corresponding data paths of the plurality of data paths in the snapshot that include the one or more terms, and wherein the count index information maps the plurality of data paths in the snapshot to corresponding numerical fields; and
- store, in the index registry at the data management system, the term index information, the count index information, and a group identifier that indicates the term index information and the count index information are associated with a same index information group, wherein the namespace index information and the hierarchical index information are common to a plurality of index information groups associated with the data management system.

* * * * *